United States Patent
Hakamada et al.

(10) Patent No.: US 11,661,218 B2
(45) Date of Patent: May 30, 2023

(54) EXPLORATION METHOD, EXPLORATION SYSTEM, PROBE, HYDROGEN SUPPLY METHOD, AND IMAGE PROCESSING METHOD

(71) Applicant: ispace, inc., Tokyo (JP)

(72) Inventors: Takeshi Hakamada, Tokyo (JP); Takahiro Nakamura, Tokyo (JP); John Walker, Tokyo (JP); Toshiro Shimizu, Tokyo (JP); Toshiki Tanaka, Tokyo (JP); Daisuke Furutomo, Tokyo (JP); Yu Kudo, Tokyo (JP); Kiyona Miyamoto, Tokyo (JP); Daishi Matsukura, Tokyo (JP); Mohamed Ragab, Tokyo (JP); Abdelkader Haouchine, Tokyo (JP); Damien Haikal, Tokyo (JP); Chit Hong Yam, Tokyo (JP); Julian Jakub Gramatyka, Tokyo (JP)

(73) Assignee: ISPACE, INC., Tokyo (JP)

( * ) Notice: Subject to any disclaimer, the term of this patent is extended or adjusted under 35 U.S.C. 154(b) by 1050 days.

(21) Appl. No.: 16/324,537

(22) PCT Filed: Aug. 8, 2017

(86) PCT No.: PCT/JP2017/028680
§ 371 (c)(1),
(2) Date: Apr. 27, 2019

(87) PCT Pub. No.: WO2018/030366
PCT Pub. Date: Feb. 15, 2018

(65) Prior Publication Data
US 2019/0248517 A1 Aug. 15, 2019

(30) Foreign Application Priority Data
Aug. 10, 2016 (WO) .................. PCT/JP2016/073659

(51) Int. Cl.
*B64G 5/00* (2006.01)
*E21C 51/00* (2006.01)
(Continued)

(52) U.S. Cl.
CPC ............... *B64G 5/00* (2013.01); *B64G 1/105* (2013.01); *B64G 1/1085* (2013.01); *B64G 1/16* (2013.01);
(Continued)

(58) Field of Classification Search
CPC ........ B64G 5/00; B64G 1/105; B64G 1/1085; B64G 1/16; B64G 1/421; B64G 1/443;
(Continued)

(56) References Cited

U.S. PATENT DOCUMENTS 3,262,654 A * 7/1966 Kaempen ............... B64G 1/646
244/172.4
5,260,639 A * 11/1993 De Young ............... H01Q 1/248
244/1 R
(Continued)

FOREIGN PATENT DOCUMENTS

CN 103253372 A 8/2013
DE 102004004543 A1 * 9/2005 ............. B64G 1/007
(Continued)

OTHER PUBLICATIONS

WIPO, International Search Report for PCT/JP2016/073659, dated Sep. 20, 2016.
(Continued)

*Primary Examiner* — Donald J Wallace
*Assistant Examiner* — Jalal C Coduroglu

(57) ABSTRACT

An exploration method includes: a step of exploring a natural resource on a satellite, a minor planet, or a planet; a
(Continued)

step of acquiring the natural resource detected by the exploration; and a step of storing the acquired natural resource.

4 Claims, 15 Drawing Sheets

(51) Int. Cl.
| | |
|---|---|
| B64G 1/10 | (2006.01) |
| B64G 1/16 | (2006.01) |
| B64G 1/42 | (2006.01) |
| B64G 1/44 | (2006.01) |
| B64G 1/66 | (2006.01) |
| B64G 3/00 | (2006.01) |
| C25B 1/04 | (2021.01) |
| H04N 5/265 | (2006.01) |
| H04N 5/225 | (2006.01) |

(52) U.S. Cl.
CPC ............ *B64G 1/421* (2013.01); *B64G 1/443* (2013.01); *B64G 1/66* (2013.01); *B64G 3/00* (2013.01); *C25B 1/04* (2013.01); *E21C 51/00* (2013.01); *H04N 5/265* (2013.01); *B64G 2001/1071* (2013.01); *H04N 5/2253* (2013.01)

(58) Field of Classification Search
CPC .... B64G 1/66; B64G 3/00; B64G 2001/1071; B64G 1/1014; B64G 1/62; B64G 1/402; B64G 1/44; B64G 2001/1064; B64G 9/00; C25B 1/04; E21C 51/00; H04N 5/265; H04N 5/2253; H04N 5/2256; Y02E 60/36
See application file for complete search history.

(56) References Cited

U.S. PATENT DOCUMENTS

| | | | | |
|---|---|---|---|---|
| 5,798,651 | A * | 8/1998 | Aruga | G01R 31/01 324/750.25 |
| 7,559,508 | B1 * | 7/2009 | Taylor | B64G 1/242 244/172.3 |
| 7,822,457 | B2 * | 10/2010 | Lokhandwalla | A61B 5/0091 600/407 |
| 9,061,235 | B1 * | 6/2015 | Califorrniaa | B01D 53/28 |
| 10,718,750 | B1 * | 7/2020 | McDaniel | G01N 35/0099 |
| 2004/0031885 | A1 * | 2/2004 | D'Ausilio | B64G 1/503 244/171.1 |
| 2006/0208136 | A1 * | 9/2006 | Cook | B64G 1/005 244/171.3 |
| 2008/0217482 | A1 * | 9/2008 | Ellinghaus | B64G 1/222 244/171.1 |
| 2008/0237400 | A1 * | 10/2008 | Gryniewski | B64G 1/14 244/172.4 |
| 2009/0067792 | A1 * | 3/2009 | Curdt | C03C 13/046 385/115 |
| 2010/0187364 | A1 * | 7/2010 | Kutter | B64G 1/54 62/51.1 |
| 2010/0263709 | A1 * | 10/2010 | Norman | F24S 30/452 136/246 |
| 2011/0260007 | A1 * | 10/2011 | Adachi | B64G 1/50 244/171.7 |
| 2012/0080563 | A1 * | 4/2012 | Gryniewski | B25J 11/00 244/172.5 |
| 2012/0112009 | A1 | 5/2012 | Gryniewski et al. | |
| 2012/0325972 | A1 | 12/2012 | Gryniewski et al. | |
| 2013/0118112 | A1 | 5/2013 | Cao et al. | |
| 2013/0233974 | A1 * | 9/2013 | Maiboroda | B64G 1/002 244/158.2 |
| 2014/0165461 | A1 * | 6/2014 | Cao | C25B 15/08 47/17 |
| 2014/0262278 | A1 * | 9/2014 | Walton | E21B 43/24 166/57 |
| 2016/0024921 | A1 * | 1/2016 | Ethridge | H05B 6/72 219/385 |
| 2020/0240267 | A1 * | 7/2020 | Sercel | E21B 7/15 |
| 2020/0413107 | A1 * | 12/2020 | Allen | H04N 21/21805 |
| 2021/0099933 | A1 * | 4/2021 | Matsuda | H04W 36/0055 |

FOREIGN PATENT DOCUMENTS

| | | | |
|---|---|---|---|
| JP | S58-156500 A | 9/1983 | |
| JP | H07-064631 A | 3/1995 | |
| JP | H07-064633 A | 3/1995 | |
| JP | H07-064634 A | 3/1995 | |
| JP | 2000-009373 A | 1/2000 | |
| JP | 2000-088598 A | 3/2000 | |
| JP | 2002-033761 A | 1/2002 | |
| JP | S58-156500 A | 1/2002 | |
| JP | 2003-287785 A | 10/2003 | |
| JP | 2010-132261 A | 6/2010 | |
| JP | 2013-237443 A | 11/2013 | |
| JP | 2013-542345 A | 11/2013 | |
| JP | 2014-530595 A | 11/2014 | |
| RU | 2735441 C1 * | 11/2020 | |
| WO | WO-2004100171 A2 * | 11/2004 | ........... B64G 1/1078 |
| WO | WO-2005073085 A1 * | 8/2005 | ............. B64G 1/007 |
| WO | WO-2008109993 A1 * | 9/2008 | .............. B25J 11/00 |
| WO | WO-2018029841 A1 * | 2/2018 | .............. B25J 11/00 |

OTHER PUBLICATIONS

WIPO, Written Opinion for PCT/JP2016/073659, dated Sep. 20, 2016.
WIPO, International Search Report for PCT/JP2017/028680, dated Sep. 20, 2016.
Yuta Koike et al., "Development of a wired sensor node launching position control system", JSME Conference on Robotics and Mechatronics conference'12 Koen Ronbunshu, The Japan Society of Mechanical Engineers, p. 1, May 27, 2012 (Cited in International Search Report and Written Opinion for PCT/JP2017/028680).
Shogo Takanashi et al., "Wakusei Tansa Rover no Tangan Camera o Mochiita Jiritsu Soko ni Kansuru Kento", The 28th Annual Conference of the Robotics Society of Japan Yokoshu DVD-ROM 2010, pp. 1 to 2, Sep. 24, 2010 (Cited in International Search Report and Written Opinion for PCT/JP2017/028680).
Takashi Kubota, "Image Processing for Deep Space Exploration", IPSJ SIG Notes, vol. 2003, No. 2, pp. 23 to 29, Jan. 17, 2003 (Cited in International Search Report and Written Opinion for PCT/JP2017/028680).
WIPO, Written Opinion for PCT/JP2017/028680, dated Sep. 20, 2016.
Kazuya Takeda et al., "100 m Laser Energy Transportation Experiment to a Model Rover to Explore the Ice on the Moon", Journal of the Japan Society for Aeronautical and Space Sciences, vol. 51(2003), No. 594, pp. 393 to 396, ISSN 1344-6460, particularly, pp. 393 to 395, Sep. 26, 2003 (Cited in International Search Report and Written Opinion for PCT/JP2016/073659 and cited in International Search Report and Written Opinion for PCT/JP2017/028680).
Tetsuo Sueyoshi et al., "Tsuchi no Toketsu to Jiban Kogaku 13.Wakusei no Eikyu Todo, Tsuchi to Ki so", vol. 52, No. 3, Ser.No. 554, pp. 63 to 68, ISSN 0041-37 98, particularly, p. 64, Mar. 1, 2004 (Cited in International Search Report and Written Opinion for PCT/JP2016/073659 and cited in International Search Report and Written Opinion for PCT/JP2017/028680).
Yuki Manno et al., "Simulation and Analysis of grouped rovers for planetary investigations", Proceedings of the Annual Conference of JSAI, 2011 Nendo Proceedings of the Annual Conference of JSAI (The 25th), pp. 1 to 3, ISSN 1347-9881. particularly, p. 1 , Jun. 3, 2011 (Cited in International Search Report and Written Opinion for PCT/JP2016/073659 and cited in International Search Report and Written Opinion for PCT/JP2017/028680).
Yasuharu Kunii, "Study on Science Rover for Lunar Geological Exploration Mission: SELENE-B", The 20th Anniversary Annual Conference of the Robotics Society of Japan CD-ROM 2002, The Robotics Society of Japan, p. 1, Oct. 12, 2002 (Cited in International Search Report and Written Opinion for PCT/JP2017/028680).

(56) References Cited

OTHER PUBLICATIONS

Ichiro Nakatani et al., "Tsuki Wakusei Tansa Rover", Journal of the Robotics Society of Japan, vol. 14, No. 7, p. 941, Oct. 15, 1996 (Cited in International Search Report and Written Opinion for PCT/JP2017/028680).

Kazuya Yoshida et al., "Development of a Moletype Robot for Lunar/Planetary Sub-Surface Exploration, and its Performance Evaluation", The 20th Anniversary Annual Conference of the Robotics Society of Japan CD-ROM 2002, The Robotics Society of Japan, p. 2, Oct. 12, 2002 (Cited in International Search Report and Written Opinion for PCT/JP2017/028680).

Takashi Kubota, "Rover design for lunar or planetary exploration", Journal of the Robotics Society of Japan, vol. 17, No. 5, pp. 610, 612, Jul. 15, 1999 (Cited in International Search Report and Written Opinion for PCT/JP2017/028680).

Ichiro Nakatani, "Uchu ni Okeru Saikin no AI Gijutsu", Journal of Japanese Society for Artificial Intelligence, vol. 16, No. 1, p. 107, Jan. 1, 2001 (Cited in International Search Report and Written Opinion for PCT/JP2017/028680).

Keiki Takadama et al., "Autonomy in Deep Space Spacecraft and its Verification and Validation", Journal of the Robotics Society of Japan, vol. 21, No. 5, p. 490, Jul. 15, 2003 (Cited in International Search Report and Written Opinion for PCT/JP2017/028680).

Hideki Kato et al., "Solar Denryoku Sail Tansaki Kaihatsu Jokyo", ISAS News, No. 420 separate volume, Institute of Space and Astronautical Science, pp. 23 to 24, Mar. 2016 (Cited in International Search Report and Written Opinion for PCT/JP2017/028680).

\* cited by examiner

FIG.14
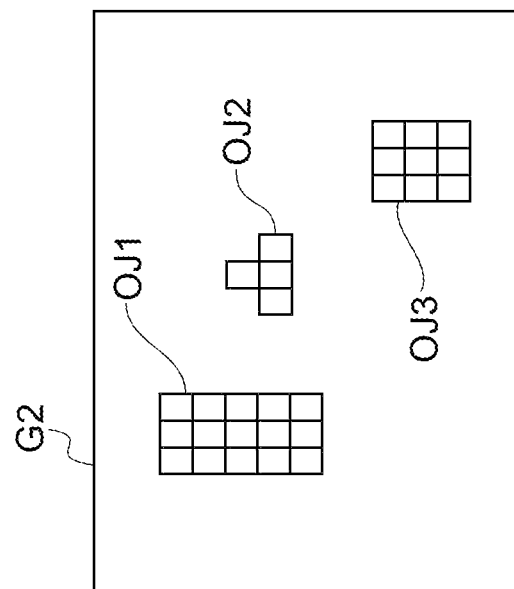
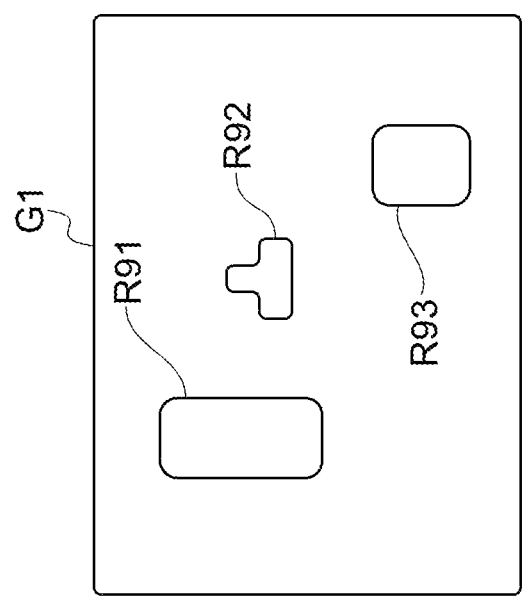

EXPLORATION METHOD, EXPLORATION SYSTEM, PROBE, HYDROGEN SUPPLY METHOD, AND IMAGE PROCESSING METHOD

TECHNICAL FIELD

The present disclosure relates to an exploration method, an exploration system, a space probe, a hydrogen supply method, and an image processing method.

BACKGROUND ART

A space probe used for a moon or planet exploration activity has been known. For example, a vehicle (see JP 2010-132261 A) for space exploration which is capable of traveling on a moon surface or a planet, such as the Mars rover of United States has been known as the space probe.

SUMMARY OF INVENTION

An exploration method according to an aspect of the present disclosure includes: a step of exploring a natural resource on a satellite, a minor planet, or a planet; a step of acquiring the natural resource detected by the exploration; and a step of storing the acquired natural resource.

BRIEF DESCRIPTION OF DRAWINGS

FIG. 14 is a schematic diagram for describing an image processing according to the ninth embodiment.

DESCRIPTION OF EMBODIMENTS

Figure 1:
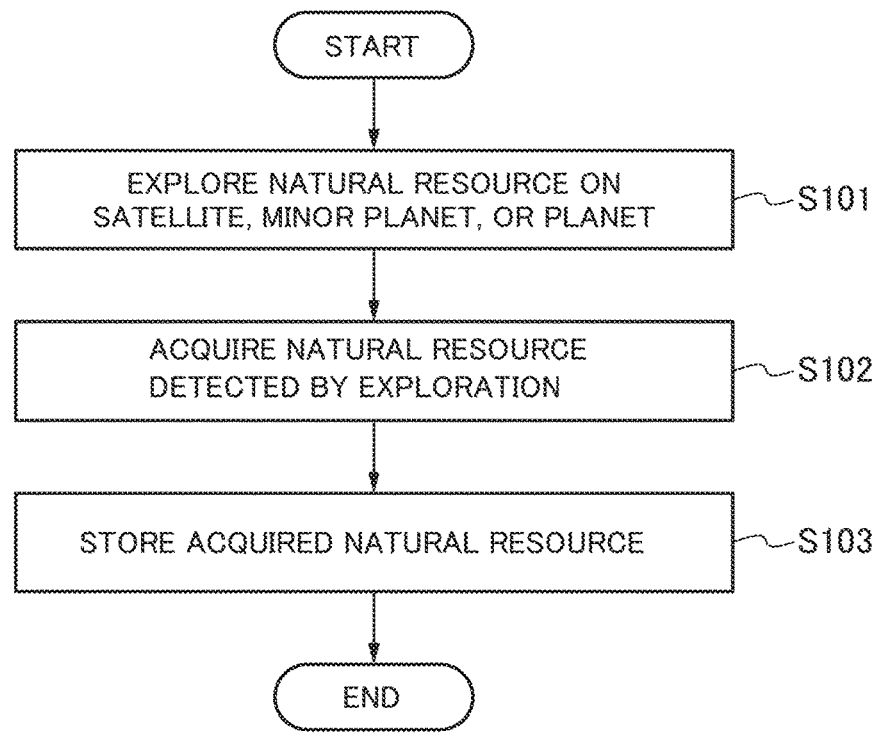
FIG. 1 is a flowchart showing a flow of an exploration method according to the present embodiment.

However, an activity of exploring a satellite, a minor planet, or a planet so far has been limited to photographing a state of the satellite, the minor planet, or the planet, and an effective exploration activity for a natural resource has not been specified.

The present disclosure has been made to solve the problems described above, and an object of the present disclosure is to provide an exploration method, an exploration system, and a space probe which enable effective use of a natural resource on a satellite, a minor planet, or a planet.

An exploration method according to a first aspect of the present disclosure includes: a step of exploring a natural resource on a satellite, a minor planet, or a planet; a step of acquiring the natural resource detected by the exploration; and a step of storing the acquired natural resource.

According to the configuration, a natural resource on a satellite, a minor planet, or a planet is stored, such that it is possible to effectively use the stored natural resource later.

In the exploration method according to a second aspect of the present disclosure described in the exploration method according to the first aspect, the natural resource is water, and in the acquiring step, the water is acquired by collecting vapor obtained by evaporating ice included in soil or a rock.

According to the configuration, water can be acquired and stored, and thus it is possible to use water on the moon.

In the exploration method according to a third aspect of the present disclosure described in the exploration method according to the second aspect, the satellite is the moon, in the exploring step, a recess corresponding to permanent shadow of the moon is explored, and in the acquiring step, the water is acquired by collecting vapor obtained by evaporating ice through heating of soil or a rock in the recess corresponding to the permanent shadow.

According to the configuration, water can be acquired and stored in a recess of the moon, and thus it is possible to use water on the moon.

The exploration method according to a fourth aspect of the present disclosure described in the exploration method according to any one of the first to third aspects further includes a step of generating, by a solar cell disposed on a moon surface other than the permanent shadow, power, wherein in the acquiring step, the water is acquired by collecting vapor obtained by evaporating ice through heating of soil or a rock using the generated power.

According to the configuration, even in a case of the recess corresponding to the permanent shadow, it is possible to heat soil or a rock in the recess by using power generated by the solar cell disposed on the moon surface other than the permanent shadow.

In the exploration method according to a fifth aspect of the present disclosure described in the exploration method according to the first to fourth aspects, in the storing step, the acquired water is delivered to a tank through a pipe to be stored in the corresponding tank.

According to the configuration, water is stored in the tank, and thus it is possible to use water in outer space.

An exploration system according to a sixth aspect of the present disclosure includes: a detection unit which detects a natural resource on a satellite, a minor planet, or a planet; an acquisition unit which acquires the natural resource detected by the detection unit; and a storage which stores the acquired natural resource.

According to the configuration, water can be acquired and stored, and thus it is possible to use water on the moon.

In the exploration system according to a seventh aspect of the present disclosure described in the exploration system according to the sixth aspect, the natural resource is water, and the acquisition unit acquires the water by collecting vapor obtained by evaporating ice included in soil or a rock.

According to the configuration, it is possible to acquire water from ice included in soil or a rock.

In the exploration system according to an eighth aspect of the present disclosure described in the exploration system according to the sixth or seventh aspect, the natural resource is water, the storage is a tank, the exploration system further includes a pipe connected to the tank, and the water acquired by the acquisition unit is delivered to the tank through the pipe.

According to the configuration, water is delivered to a tank through a pipe to thereby accumulate water in the tank.

The exploration system according to a ninth aspect of the present disclosure described in the exploration system according to the eighth aspect includes a space probe which includes the detection unit and the acquisition unit, is connected to one end portion of the pipe, and is disposed in a recess corresponding to permanent shadow of the moon, and a spacecraft which includes the tank connected to the other end portion of the pipe and is disposed on a moon surface other than the recess.

According to the configuration, even in a case where the space probe cannot move from the recess to the moon surface due to a factor such as a slope of the recess, an obstacle present on the slope of the recess, or the like, water is accumulated in the tank of the spacecraft through the pipe, such that it is possible to deliver the water to the outside from the recess.

In the exploration method according to a tenth aspect of the present disclosure described in the exploration method according to the ninth aspect, the spacecraft includes a solar cell, and a control unit which performs a control to supply power generated by the solar cell to the space probe, and the acquisition unit included in the space probe acquires water by evaporating ice through heating of soil or a rock using the generated power.

According to the configuration, the solar cell disposed on the moon surface other than the permanent shadow generates power and the generated power is supplied to the space probe. For this reason, the acquisition unit in the space probe can acquire water by collecting vapor obtained by evaporating ice through heating of soil or a rock with the generated heat.

In the exploration system according to an eleventh aspect of the present disclosure described in the exploration system according to the ninth or tenth aspect, the spacecraft is a space probe which includes wheels and is able to travel.

According to the configuration, it is possible to supply the water accumulated in the tank to a desired place on the moon surface.

In the exploration system according to a twelfth aspect of the present disclosure described in the exploration system according to the ninth or tenth aspect, the spacecraft is a lander which includes a communication unit which is communicable with an earth station on the earth.

According to the configuration, water is stored in the lander on the moon, such that it is possible to effectively use the stored water later.

A space probe according to a thirteenth aspect of the present disclosure includes: a detection unit which detects a natural resource on a satellite, a minor planet, or a planet; and an acquisition unit which acquires the natural resource detected by the detection unit, wherein the acquired natural resource is stored in a storage.

According to the configuration, a natural resource on a satellite, a minor planet, or a planet is stored, such that it is possible to effectively use the stored natural resource later.

An exploration system according to a fourteenth aspect of the present disclosure includes: an artificial satellite which orbits a satellite, a minor planet, or a planet; and a space probe which is communicable with the artificial satellite wirelessly.

According to the configuration, the space probe can receive a signal from the artificial satellite.

In the exploration system according to a fifteenth aspect of the present disclosure described in the exploration system according to the fourteenth aspect, the number of artificial satellites is three or more, and the space probe receives positioning signals for positioning from the plurality of artificial satellites to specify a position where the corresponding space probe is present on the satellite, the minor planet, or the planet according to the plurality of received positioning signals.

According to the configuration, the space probe can specify a position where the corresponding space probe is present on a satellite, a minor platen, or a planet.

In the exploration system according to a sixteenth aspect of the present disclosure described in the exploration system according to the fourteenth or fifteenth aspect, the artificial satellite wirelessly transmits a position signal indicating a position where a natural resource is present to the space probe, and the space probe receives the position signal and moves to approach the position indicated by the received position signal.

According to the configuration, the space probe can move to a position where a natural resource is present.

In the exploration system according to a seventeenth aspect of the present disclosure described in the exploration system according to any one of the fourteenth to sixteenth aspects, the artificial satellite wirelessly transmits a route signal indicating a route to the position where a natural resource is present to the space probe, and the space probe receives the route signal and moves based on the received route signal.

According to the configuration, the space probe can easily move to a position where a natural resource is present.

An exploration system according to an eighteenth aspect of the present disclosure includes: at least one space probe; and at least one lander, wherein the respective landers, the lander and the space probe, and/or the respective space probes are connected to each other through a power cable and a communication cable.

According to the configuration, respective landers, a lander and a space probe, and respective space probes are connected to each other by the power cable and the communication cable, and thus an exchange of data and an exchange of power can be performed, such that it is possible to realize more flexible and efficient exploration.

An exploration system according to a nineteenth aspect of the present disclosure includes a reflecting plate and a space probe which includes a solar panel, wherein when the space probe is in a place shaded from sunlight, the sunlight is reflected by the reflecting plate to allow the space probe to be irradiated with the sunlight, such that power is generated by the solar panel of the space probe.

According to the configuration, power can be generated even in a place where the space probe is shaded from sunlight, such that it is possible to continue exploration by using the generated power.

In the exploration system according to a twentieth aspect of the present disclosure described in the nineteenth aspect, the reflecting plate is provided on a lander or another space probe, and the lander or the other space probe is disposed at a position where sunlight directly reaches.

According to the configuration, it is possible to reflect sunlight by using the reflecting plate.

A hydrogen supply method according to a twenty-first aspect of the present disclosure includes: a step of collecting water in a satellite, a minor planet, or a planet; a step of electrolyzing the collected water; a step of filling a tank of a space probe with hydrogen obtained by the electrolysis; and a step of supplying the hydrogen from the tank of the space probe to a target of a supply destination.

According to the configuration, it is possible to supply hydrogen to a target of a supply destination.

In the hydrogen supply method according to an twenty-second aspect of the present disclosure described in the exploration system according to the twenty-first aspect, the target is a tank of a lander, in the supplying step of the hydrogen, the hydrogen is supplied from the tank of the space probe to the tank of the lander, and the hydrogen supply method further includes a step of taking off the lander using the supplied hydrogen, and a step of supplying hydrogen to a spacecraft as a hydrogen supply target in outer space or in an orbit of the satellite, the minor planet, or the planet.

According to the configuration, it is possible to supply hydrogen to a spacecraft as a hydrogen supply target.

An exploration method according to a twenty-third aspect of the present disclosure includes: a step of supplying fuel from a lander including a tank filled with the corresponding fuel to a tank of a space probe; and a step of driving, by the space probe, a power source by using the supplied fuel.

According to the configuration, it is possible to utilize fuel remaining in the tank of the lander as fuel of the space probe.

An exploration method according to a twenty-fourth aspect of the present disclosure includes: a step of ejecting a camera from a space probe including an ejection mechanism; a step of performing, by the camera, photographing at a spot where the camera lands after being ejected; and a step of transmitting, by the camera, an image obtained by the photographing to the space probe.

According to the configuration, even in a place where it is difficult for the space probe to enter, it is possible to obtain an image of an area in the vicinity of the corresponding place where it is difficult for the space probe to enter by flying a camera.

An image processing method according to a twenty-fifth aspect of the present disclosure includes: a step of substituting, by a lander or a space probe, an image region of an obstacle included in an image photographed by a camera mounted in the space probe with an object constituted by polygons, or an object constituted by predetermined image units; and a step of transmitting an image obtained after the substitution from the lander to an earth station.

According to the configuration, it is possible to suppress an amount of traffic between the lander and the earth station.

A natural resource according to the present embodiment is a raw material which can be obtained from nature. Examples of the natural resource include water, a mineral, an organism, and the like. Hereinafter, the present embodiment will be described with reference to the accompanying drawings.

FIG. 1 is a flowchart showing a flow of an exploration method according to the present embodiment.

(Step S101) First, a natural resource on a satellite, a minor planet, or a planet is explored.

(Step S102) Next, the natural resource detected by the exploration is acquired.

(Step S103) Next, the acquired natural resource is stored.

In the exploration method according to the present embodiment described above, a natural resource on a satellite, a minor planet, or a planet is stored, such that it is possible to effectively use the stored natural resource later.

In each of embodiments described below, a case where an exploration system is used for a moon exploration activity will be described as an example. Further, in each embodiment, water will be described as an example of the natural resource. It should be noted that the exploration system according to each embodiment can also be used for an activity of exploring a planet, a minor planet, another satellite, or the like.

First Embodiment

Figure 2:
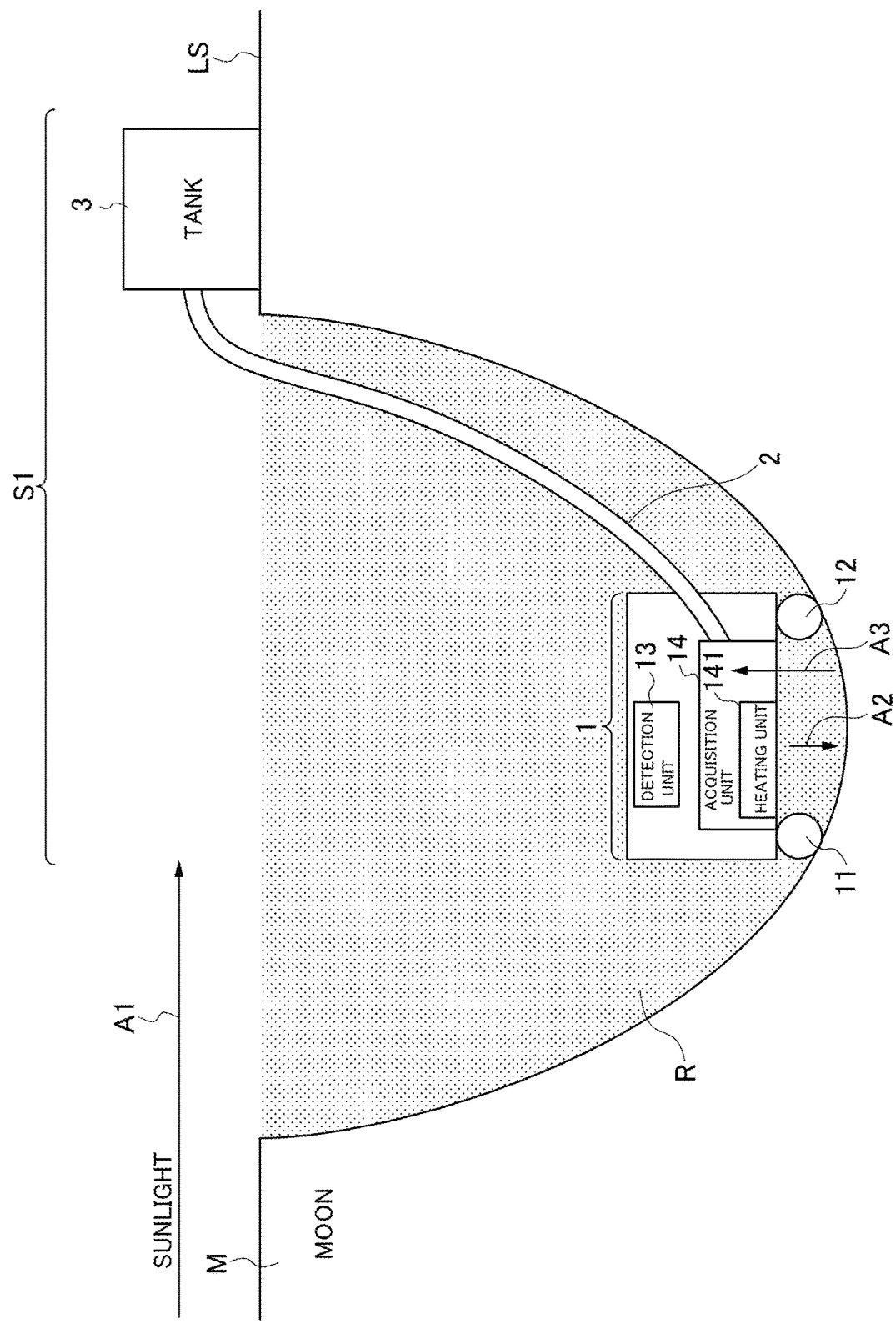
FIG. 2 is a diagram schematically showing an exploration system according to a first embodiment.

First, a first embodiment will be described. FIG. 2 is a diagram schematically showing an exploration system according to a first embodiment. As indicated by an arrow A1 in FIG. 2, sunlight is incident in parallel to a moon surface LS in the vicinity of the North Pole of the moon M. For this reason, an inner portion of a recess R formed in the vicinity of the North Pole of the moon M becomes permanent shadow permanently shaded from sunlight. The recess R is, for example, a crater.

As shown in FIG. 2, an exploration system S1 includes a space probe 1, a tank 3, and a pipe 2 which connects the space probe 1 and the tank 3 to each other and through which water passes. The tank 3 is an example of a storage and is installed on the moon surface LS.

The space probe 1 is an unmanned probe and is operated according to a command from an earth station on the earth. The space probe 1 includes wheels 11 and 12 and can travel on the moon surface LS. The space probe 1 travels to enter the inside of the recess R as shown in FIG. 2.

Further, the space probe 1 includes a detection unit 13 and an acquisition unit 14.

The detection unit 13 detects a natural resource on a satellite, a minor planet, or a planet. According to the present embodiment, the detection unit 13 detects water in the recess R corresponding to the permanent shadow of the moon M. For example, the detection unit 13 detects a presence or absence of hydrogen and heavy hydrogen by using a neutron spectrometer, thereby detecting a presence or absence of water. The detection unit 13 may detect a presence or absence of water by detecting conductivity, or may detect water by a mass spectrometer, chromatography, or imaging.

The acquisition unit 14 acquires the natural resource detected by the detection unit 13. According to the present embodiment, the acquisition unit 14 acquires water detected by the detection unit 13. According to the present embodiment, the acquisition unit 14 includes a heating unit 141. The acquisition unit 14 heats soil or a rock by using the heating unit 141 as indicated by an arrow A2 in the recess R corresponding to the permanent shadow. By doing so, ice included in the soil or the rock evaporates. Thereafter, the acquisition unit 14 acquires water by collecting vapor rising as indicated by an arrow A3. Here, the soil includes regolith of the moon surface LS. With this arrangement, it is possible to acquire water by collecting vapor obtained by evaporating ice included in soil (for example, regolith) or a rock.

According to the present embodiment, the natural resource is water, the storage is the tank 3, and the pipe connects the acquisition unit 14 and the tank 3 to each other.

With this arrangement, the water acquired by the acquisition unit 14 is delivered to the tank 3 through the pipe 2.

Figure 3:
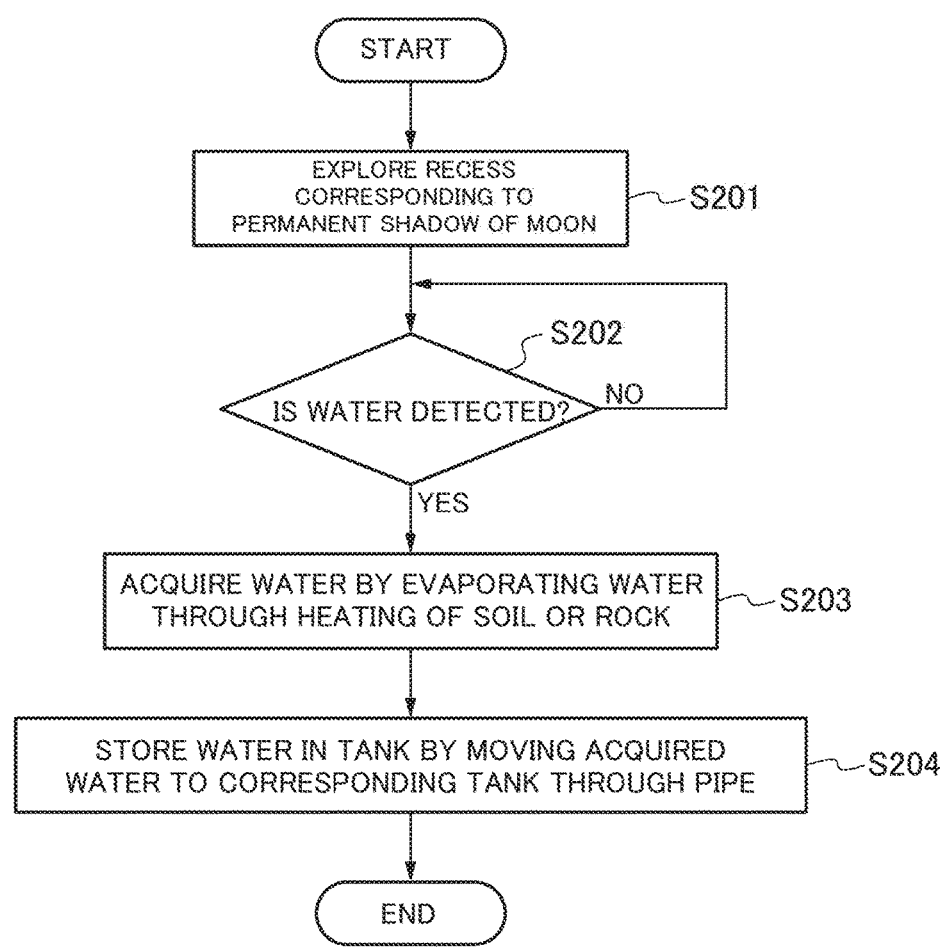
FIG. 3 is a flowchart showing an example of a flow of the exploration method according to the first embodiment.

FIG. 3 is a flowchart showing an example of a flow of the exploration method according to the first embodiment.

(Step S201) First, the space probe 1 explores the recess R corresponding to the permanent shadow of the moon.

(Step S202) Next, the space probe 1 determines whether or not water is detected.

(Step S203) When the water is detected in step 202, the space probe 1 acquires the water by collecting vapor obtained by evaporating ice included in soil or a rock through heating of the soil or the rock.

(Step S204) Next, the acquired water is delivered to the corresponding tank 3 through the pipe 2, such that the water is stored in the corresponding tank 3.

As described above, the exploration system S1 according to the first embodiment includes the detection unit 13 which detects water on the moon, the acquisition unit 14 which acquires the water detected by the detection unit 13, and the tank which stores the acquired water.

With this arrangement, water is stored on the moon, such that it is possible to effectively use the stored water later.

Second Embodiment

Next, a second embodiment will be described. In the first embodiment, the tank 3 is installed on the moon surface LS as it is, whereas in the second embodiment, one space probe includes a tank and supplies power generated by a solar cell to the other space probe.

Figure 4:
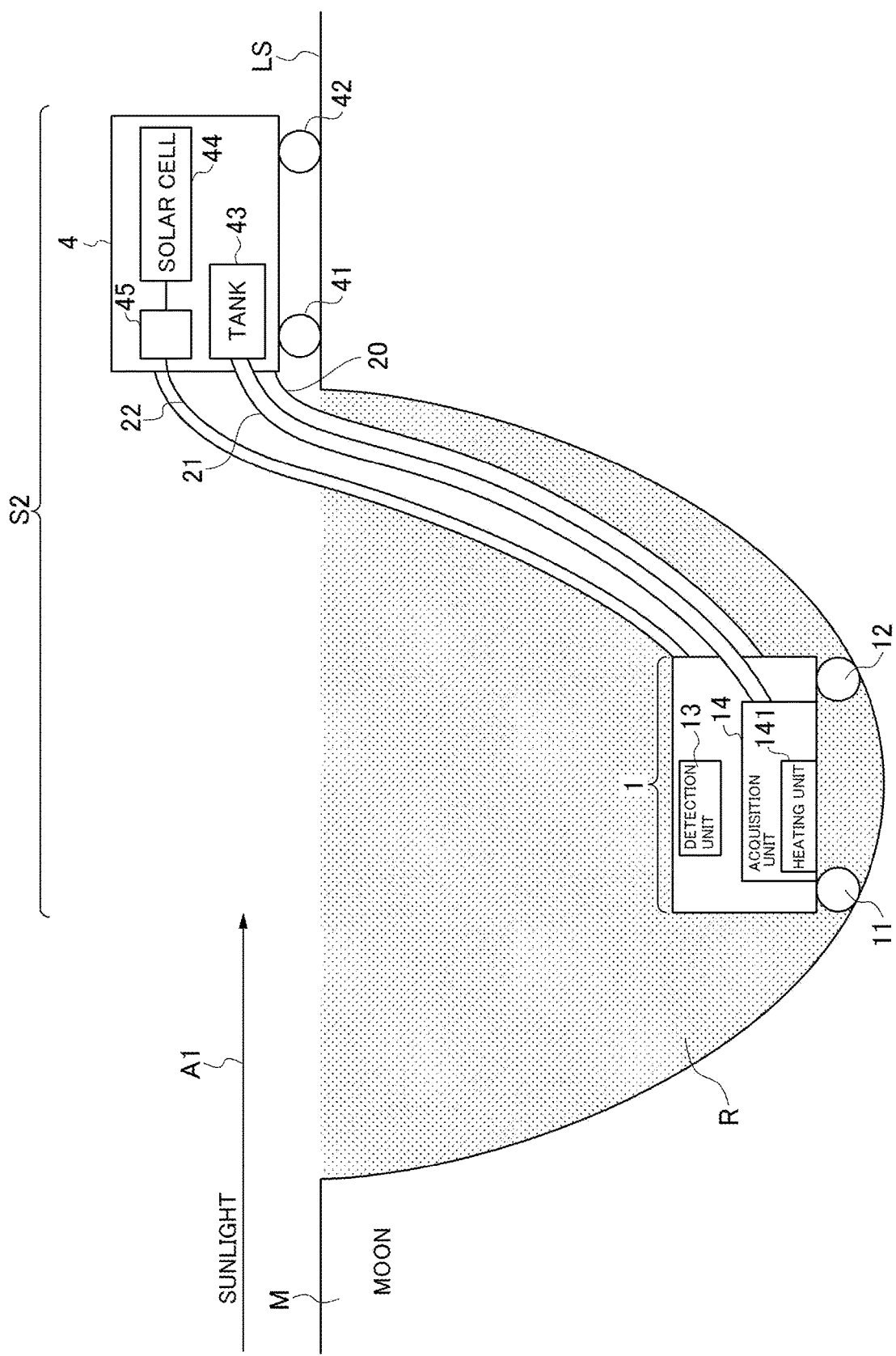
FIG. 4 is a diagram schematically showing an exploration system according to a second embodiment.

FIG. 4 is a diagram schematically showing an exploration system according to the second embodiment. The same elements as those shown in FIG. 2 are denoted by the same reference numerals, and a description thereof will be omitted. An exploration system S2 according to the second embodiment includes a space probe 1 and a space probe 4. The space probe 1 is also called a slave probe. The space probe 1 according to the second embodiment is the same as the space probe 1 according to the first embodiment, and thus a description thereof will be omitted.

The space probe 4 is an example of a spacecraft, and is also called a master probe. The space probe 4 is an unmanned probe and is operated according to a command from an earth station on the earth.

The space probe 1 and the space probe 4 are bound by a rope 20 which is called a tether. The rope 20 accommodates a pipe 21 through which water passes and a wiring 22 for supplying power. That is, one end portion of the pipe 21 is connected to the space probe 1 and the other end portion of the pipe 21 is connected to a tank 43 of the space probe 4.

The space probe 4 includes wheels 41 and 42 and can travel on the moon surface LS. The space probe 4 can move to a position at which the space probe 4 can be exposed to sunlight on the moon surface LS. Further, the space probe 4 includes the tank 43, a solar cell 44, and a control unit 45.

The water supplied from the space probe 1 through the pipe 21 is stored in the tank 43.

The control unit 45 is a controller which performs a control to supply power generated by the solar cell 44 to the space probe 1. In the present embodiment, power is supplied to the space probe 1 through the wiring 22. It should be noted that the power may be supplied in a wireless manner or in a wired manner.

As described above, the exploration system S2 according to the second embodiment includes the space probe 1 including the detection unit 13 and the acquisition unit 14 and connected to one end portion of the pipe 21, and the space probe 4 including the tank 43 connected to the other end portion of the pipe 21. The detection unit 13 detects water on the moon M and the acquisition unit 14 acquires the water detected by the detection unit 13.

With this arrangement, water is stored in the space probe 4 on the moon, such that it is possible to effectively use the stored water later.

In addition, the space probe 1 is disposed in a recess corresponding to permanent shadow, and the space probe 4 is disposed on the moon surface other than the permanent shadow and includes the solar cell 44 and the control unit 45 which performs a control to supply power generated by the solar cell 44 to the space probe 1. The acquisition unit 14 included in the space probe 1 acquires water by collecting vapor obtained by evaporating ice through heating of soil or a rock with the generated heat.

With this arrangement, the solar cell 44 disposed on the moon surface other than the permanent shadow generates power and the generated power is supplied to the space probe 1. As a result, the acquisition unit 14 included in the space probe 1 can acquire water by collecting vapor obtained by evaporating ice through heating of soil or a rock with the generated heat.

In addition, the space probe 4 according to the present embodiment includes wheels and can travel. With this arrangement, it is possible to supply the water accumulated in the tank to a desired place on the moon surface.

It should be noted that the space probe 4 may include a communication unit which is communicable with an earth station on the earth.

Third Embodiment

Next, a third embodiment will be described. The spacecraft disposed on the moon surface other than the permanent shadow according to the second embodiment is a space probe, whereas a spacecraft disposed on a moon surface other than the permanent shadow according to the third embodiment is a lander. The lander is a spacecraft which can land and stand still on a surface of a celestial body (for example, a satellite such as the moon, a minor planet, a planet, or the like).

Figure 5:
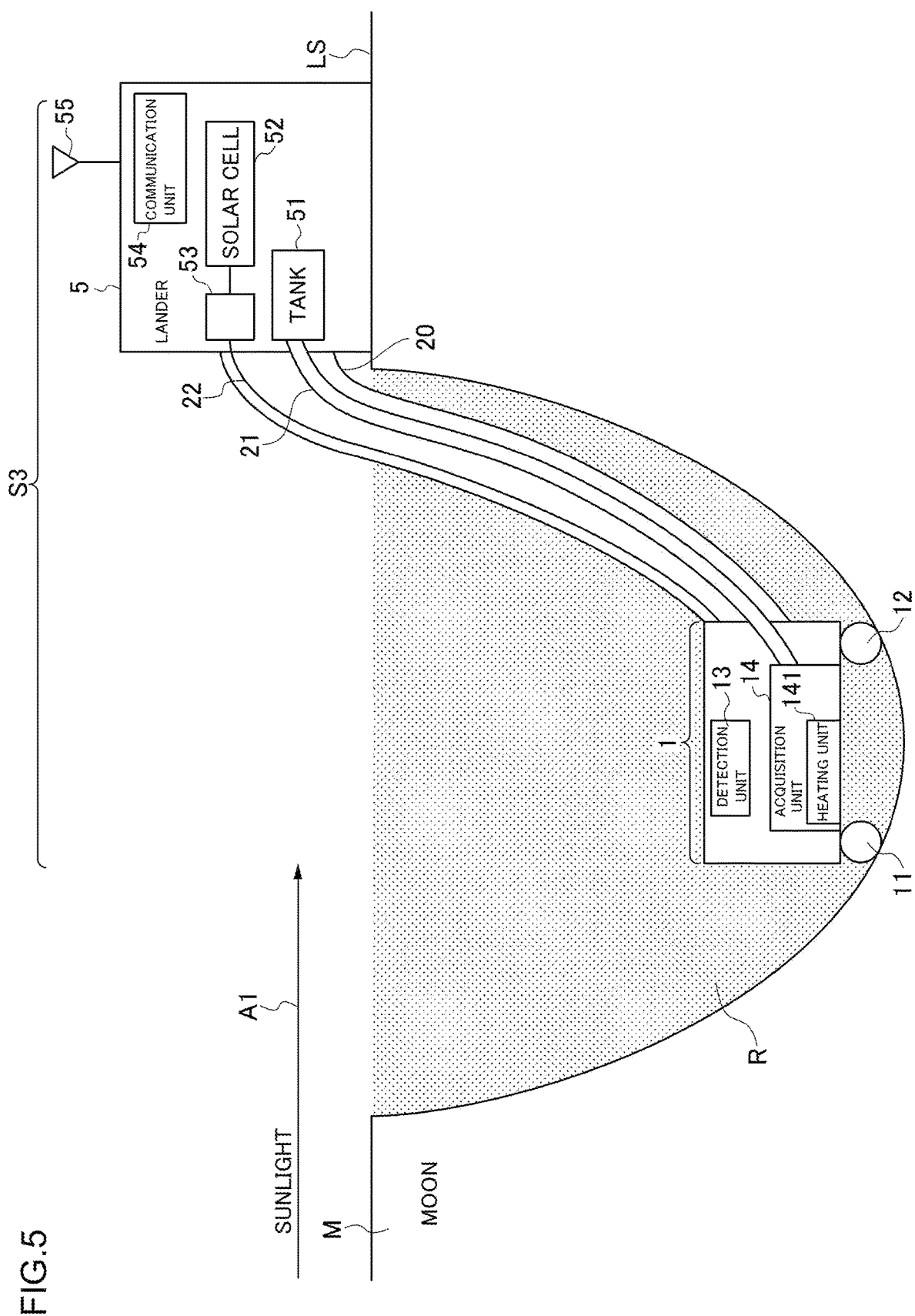
FIG. 5 is a diagram schematically showing an exploration system according to a third embodiment.

FIG. 5 is a diagram schematically showing an exploration system according to the third embodiment. The same elements as those shown in FIG. 2 are denoted by the same reference numerals, and a description thereof will be omitted. An exploration system S3 according to the third embodiment includes a space probe 1 and a lander 5. The space probe 1 according to the third embodiment is the same as the space probe 1 according to the first embodiment, and thus a description thereof will be omitted.

The lander 5 lands on a position at which the lander 5 can be exposed to sunlight on the moon surface LS.

The space probe 1 and the lander 5 are bound by a rope 20 which is called a tether, similarly to the second embodiment. The rope 20 accommodates a pipe 21 through which water passes and a wiring 22 for supplying power. That is, one end portion of the pipe 21 is connected to the space probe 1 and the other end portion of the pipe 21 is connected to a tank 51 of the lander 5.

The lander 5 includes a tank 51, a solar cell 52, a control unit 53, a communication unit 54, and an antenna 55.

Water supplied from the space probe 1 is stored in the tank 51.

The control unit 53 is a controller which performs a control to supply power generated by the solar cell 52 to the space probe 1. In the present embodiment, the power is supplied to the space probe 1 through the wiring 22.

The communication unit 54 can communicate with an earth station on the earth through the antenna 55.

As described above, the exploration system S3 according to the third embodiment includes the space probe 1 including the detection unit 13 and the acquisition unit 14 and connected to one end portion of the pipe 21, and the lander 5 including the tank 51 connected to the other end portion of the pipe 21. The detection unit 13 detects water on the moon M and the acquisition unit 14 acquires the water detected by the detection unit 13.

With this arrangement, water is stored in the lander 5 on the moon, such that it is possible to effectively use the stored water later.

Although the space probe 1 includes the detection unit 13 and the acquisition unit 14 in the respective embodiments, the present disclosure is not limited thereto, and one space probe may include the detection unit 13 and the other space probe may include the acquisition unit 14. For example, when two space probes enter a recess R, the detection unit 13 of one space probe may detect water and the acquisition unit 14 of the other space probe may acquire the water. In addition, in each embodiment, the space probe 1 may generate power by nuclear fusion.

Although the heating unit 141 directly heats soil or a rock in the respective embodiments, the present disclosure is not limited thereto, and soil may be collected or a rock may be mined and then collected materials may be heated. In addition, the acquisition unit 14 may perform heating by the heating unit 141 after digging soil up to a predetermined depth.

Fourth Embodiment

Next, a fourth embodiment will be described. According to the fourth embodiment, an artificial satellite is present in an orbit of the moon, a lander and a space probe can directly and wirelessly communicate with the artificial satellite and receive a signal from the artificial satellite. Examples of the signal include a position signal indicating a position where a natural resource is present, a route signal indicating a route to the position where the natural resource is present, a positioning signal for positioning, an image signal indicating the latest image of the moon surface, and/or the like. In addition, according to the fourth embodiment, the lander and the space probe have a wireless communication function, and landers, a lander and a space probe, and space probes can wirelessly communicate with each other. Further, respective landers, a lander and a space probe, and respective space probes are bound to each other with a rope which is called a tether, and a power cable and a communication cable are accommodated inside the cable. As described above, respective landers, a lander and a space probe, and respective space probes are connected by the power cable and the communication cable.

Figure 6:
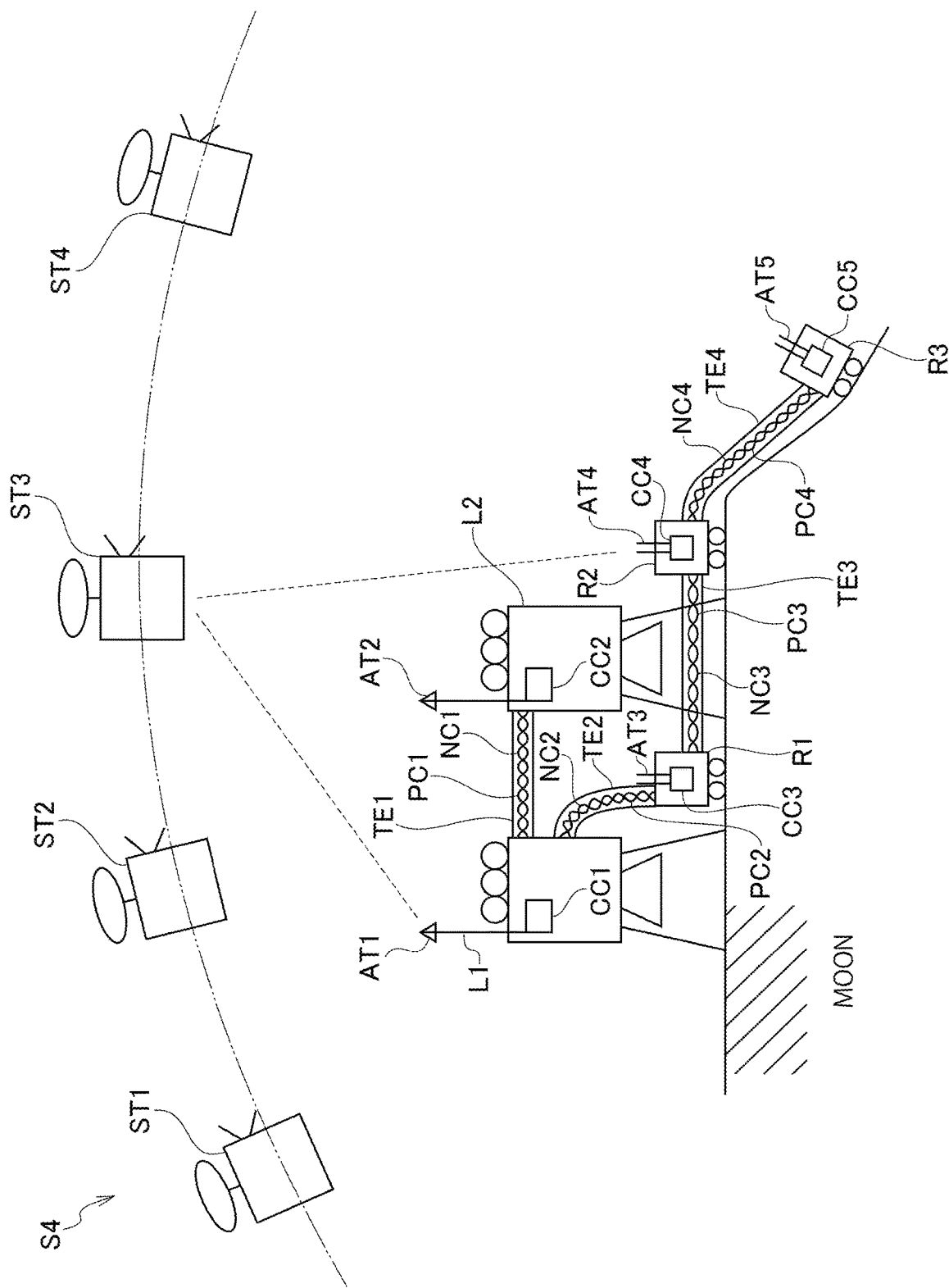
FIG. 6 is a diagram schematically showing a configuration of an exploration system according to a fourth embodiment.

FIG. 6 is a diagram schematically showing a configuration of an exploration system according to the fourth embodiment. As shown in FIG. 6, an exploration system S4 includes artificial satellites ST1, ST2, ST3, and ST4 disposed in the orbit of the moon, landers L1 and L2, and space probes R1, R2, and R3. The artificial satellites ST1, ST2, and ST3, the landers L1 and L2, and the space probes R1, R2, and R3 can perform wireless communication, respectively, and can mutually perform peer to peer communication. The space probe R3 is disposed in a recess (for example, a crater) of the moon.

The lander L1 includes an antenna AT1 for wireless communication and a wireless communication circuit CC1. Similarly, the lander L2 includes an antenna AT2 for wireless communication and a wireless communication circuit CC2. Further, the lander L1 is bound to the lander L2 with a rope TE1 which is called a tether, and a power cable PC1 and a communication cable NC1 are accommodated inside the rope TE1. As described above, the landers L1 and L2 are connected to each other by the power cable PC1 and the communication cable NC1.

The space probe R1 includes an antenna AT3 for wireless communication and a wireless communication circuit CC3. Similarly, the space probe R2 includes an antenna AT4 for wireless communication and a wireless communication circuit CC4. Similarly, the space probe R3 includes an antenna AT5 for wireless communication and a wireless communication circuit CC5.

The space probe R1 is bound to the lander L1 with a rope TE2 which is called a tether, and a power cable PC2 and a communication cable NC2 are accommodated inside the rope TE2. As described above, the space probe R1 and the lander L1 are connected to each other by the power cable PC2 and the communication cable NC2.

Similarly, the space probe R1 is bound to another space probe R2 with a rope TE3 which is called a tether, and a power cable PC3 and a communication cable NC3 are accommodated inside the rope TE3. As described above, the space probe R1 and the space probe R2 are connected to each other by the power cable PC3 and the communication cable NC3.

Similarly, the space probe R2 is bound to another space probe R3 with a rope TE4 which is called a tether, and a power cable PC4 and a communication cable NC4 are accommodated inside the rope TE4. As described above, the space probe R2 and the space probe R3 are connected to each other by the power cable PC4 and the communication cable NC4.

With this arrangement, respective landers, a lander and a space probe, and respective space probes are connected to each other by the power cable and the communication cable, and thus an exchange of data and an exchange of power can be performed, such that it is possible to realize more flexible and efficient exploration. In addition, even in a case where the wireless communication circuit or the antenna fails, it is possible to continue the exchange of data through the communication cable.

The artificial satellites ST1 to ST4 may also function as global positioning system (GPS) satellites. In this case, the space probes R1 to R3 may receive positioning signals for positioning from a plurality of artificial satellites ST1 to ST4, to specify positions where the corresponding space probes R1 to R3 are present on the moon according to the plurality of received positioning signals.

Here, the positioning signal from the artificial satellite ST1 includes, for example, transmission time data from an atomic clock mounted in the corresponding artificial satellite ST1, information of ephemerides (orbit) of the corresponding artificial satellite ST1, and the like. The same goes for the positioning signals from the artificial satellites ST2 to ST4. The space probes R1 to R3 receive electric waves from the artificial satellites ST1 to ST4, acquire a transmission time of each of the electric waves, and determine a distance from each corresponding artificial satellite by multiplying a difference between a corresponding transmission time and a reception time by a propagation speed (300,000 km/second, which is the same as the speed of light) of the electric wave.

Here, the space probes R1 to R3 each include a GPS receiver and a clock. The space probes R1 to R3 receive electric waves from four artificial satellites ST1 to ST4 and calculate a reception time of each of the electric waves and coordinates (points in a three-dimensional space) of the space probes R1 to R3 by positioning calculation. An existing GPS positioning method may be used for the positioning calculation. With this arrangement, it is possible to specify the positions of the space probes R1 to R3.

For example, the artificial satellites ST1 to ST4 may wirelessly transmit a position signal indicating a position where a natural resource is present to the space probe R1, R2, or R3. In this case, the space probe R1, R2, or R3 may receive the position signal and move to approach the position indicated by the received position signal. With this arrangement, the space probe R1, R2, or R3 can move to the position where the natural resource is present.

In addition, for example, the artificial satellites ST1 to ST4 may wirelessly transmit a route signal indicating a route to a position where a natural resource (for example, water) is present to the space probe R1, R2, or R3. In this case, the space probe R1, R2, or R3 receives the route signal and moves based on the received route signal. In detail, for example, the space probe R1, R2, or R3 may move along a route indicated by the route signal. With this arrangement, the space probe R1, R2, or R3 can easily move to the position where the natural resource is present.

As described above, the exploration system. S4 according to the fourth embodiment includes the artificial satellites ST1 to ST4 orbiting the moon and the space probes R1 to R3 which can wirelessly communicate with the artificial satellites ST1 to ST4. With this arrangement, the space probes R1 to R3 can receive a signal from the artificial satellites ST1 to ST4.

In addition, the exploration system S4 according to the fourth embodiment includes the space probes R1 to R3 and the landers L1 and L2. The landers L1 and L2, the lander L1 and the space probe R1, and the space probes R1 and R2, and the space probes R2 and R3 are connected to each other through the power cable and the communication cable. With this arrangement, respective landers, a lander and a space probe, and respective space probes are connected to each other by the power cable and the communication cable, and thus an exchange of data and an exchange of power can be performed, such that it is possible to realize more flexible and efficient exploration.

Alternatively, only a lander and a space probe, or only space probes may be connected to each other through the power cable and the communication cable. Further, the number of space probes is three, but the present disclosure is not limited thereto, and it is sufficient that at least one space probe is present. In addition, the number of landers is two, but the present disclosure is not limited thereto, and it is sufficient that at least one lander is present.

In the present embodiment, the case where there are four artificial satellites for positioning is described by way of example, but the present disclosure is not limited thereto, and three or four or more artificial satellites may be provided for positioning. Further, in a case where the positioning is not performed, the number of artificial satellites may be one or two.

Although the artificial satellite has been described as orbiting the moon, in a case where an exploration target is another satellite, a minor planet, or a planet, the artificial satellite may be a satellite orbiting the other satellite, the minor planet, or the planet. In addition, although the number of space probes has been described as being three, the number of space probes may two or less, or four or more.

Fifth Embodiment

Next, a fifth embodiment will be described. In an exploration system. S5 according to the fifth embodiment of the present disclosure, when a space probe including a solar panel is in a place shaded from sunlight, the sunlight is reflected by a reflecting plate to allow the space probe to be irradiated with the sunlight, such that power is generated by the solar panel of the space probe.

Figure 7:
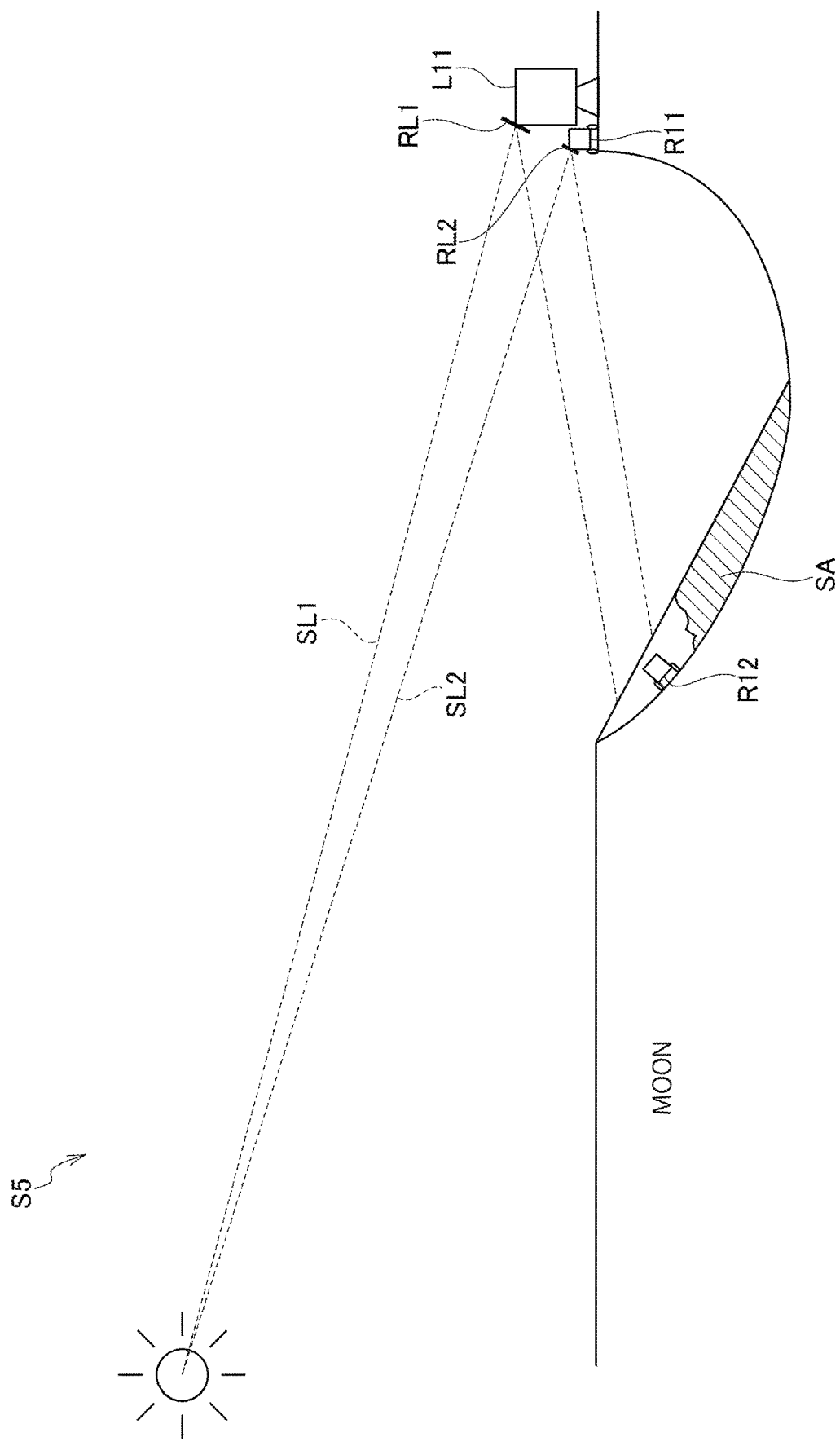
FIG. 7 is a diagram schematically showing a configuration of an exploration system according to a fifth embodiment.

FIG. 7 is a diagram schematically showing a configuration of the exploration system according to the fifth embodiment. As shown in FIG. 7, the exploration system. S5 includes a lander L11 on which a reflecting plate RL1 is provided, a space probe R11 on which a reflecting plate RL2 is provided, and a space probe R12 having an outer surface on which a solar plate (not shown) is provided. As shown in FIG. 7, the space probe R12 explores a pit of the moon and is positioned in a shadow area SA. The space probe R12 is in a place shaded from sunlight.

Here, as indicated by a light path SL1, the sunlight is reflected by the reflecting plate RL1, the space probe R12 is irradiated with the sunlight. In addition, as indicated by a light path SL2, the sunlight is reflected by the reflecting plate RL2, the space probe R12 is irradiated with the sunlight. With this arrangement, power is generated by the solar panel of the space probe R12, and the space probe R12 is driven by using the generated power. For example, the space probe R12 drives a power source (not shown, for example, a motor, an engine, or the like) using the generated power. With this arrangement, power can be generated even in a place where the space probe R12 is shaded from sunlight, such that it is possible to continue exploration by using the generated power.

As described above, the exploration system S5 according to the fifth embodiment includes the reflecting plates RL1 and RL2 and the space probe R12 including the solar panel. When the space probe R12 is in a place shaded from sunlight, the sunlight is reflected by the reflecting plates to allow the space probe R12 to be irradiated with the sunlight, such that power is generated by the solar panel of the space probe R12. According to the configuration, power can be generated even in a place where the space probe R12 is shaded from sunlight, such that it is possible to continue exploration by using the generated power.

In addition, the reflecting plates RL1 and RL2 are provided on the lander L11 or another space probe R11, and the lander L11 or the other space probe R11 is disposed at a position where sunlight directly reaches. According to the configuration, it is possible to reflect sunlight by using the reflecting plate.

The number of reflecting plates has been described as being two, but the present disclosure is not limited thereto, and the number of reflecting plates may be one, or three or more.

Sixth Embodiment

Next, a sixth embodiment will be described. In the sixth embodiment, an empty tank of a lander is filled with fuel on the moon surface, and the lander is lifted-off from the moon surface by using the fuel used to fill the lander. Then, the fuel is supplied to a spacecraft (for example, an artificial satellite) as a hydrogen supply target. Here, the spacecraft as the hydrogen supply target is positioned in an orbit of the moon, an orbit of the earth, or in outer space.

In the present embodiment, a case where the fuel is hydrogen, water is collected on the moon, the collected water is electrolyzed, a tank of a space probe is filled with hydrogen obtained by the electrolysis, and the hydrogen is supplied from the tank of the space probe to a tank of a lander will be described by way of example. Thereafter, for example, the lander takes off from the moon surface by using the supplied hydrogen and supplies hydrogen to, for example, an artificial satellite positioned in an orbit of the moon.

Figure 8:
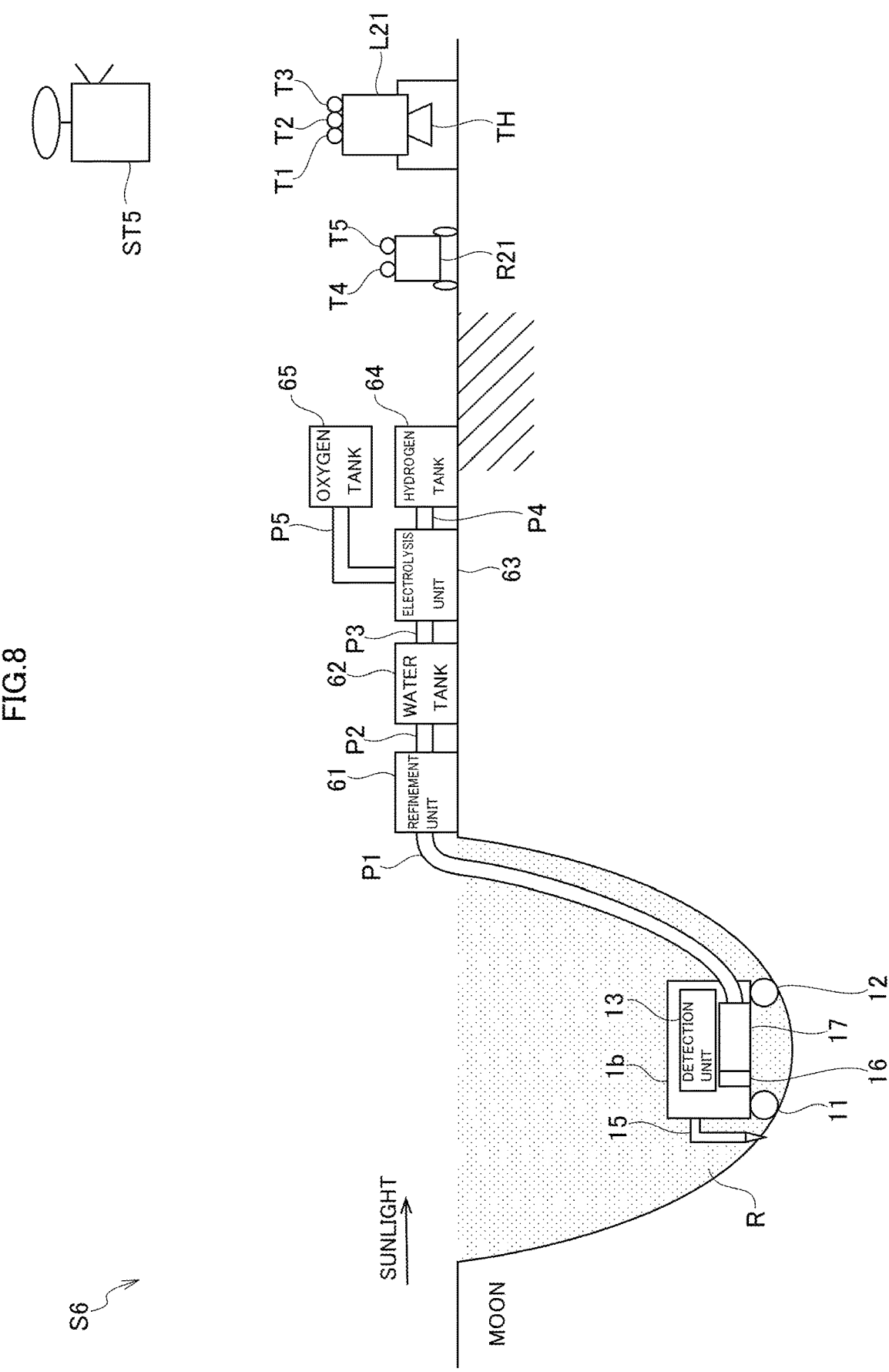
FIG. 8 is a diagram schematically showing a configuration of an exploration system according to a sixth embodiment.

FIG. 8 is a diagram schematically showing a configuration of the exploration system according to the sixth embodiment. As shown in FIG. 8, an exploration system S6 includes a space probe 1b disposed in a recess R formed in the moon surface, a refinement unit 61 connected to the space probe 1b through a pipe P1, and a water tank 62 connected to the refinement unit 61 through a pipe P2. The recess R is, for example, a crater. The exploration system S6 further includes an electrolysis unit 63 connected to the water tank 62 through a pipe P3, a hydrogen tank 64 connected to the electrolysis unit 63 through a pipe P4, and an oxygen tank 65 connected to the electrolysis unit 63 through a pipe P5.

The exploration system. S6 further includes a lander L21 including tanks T1 to T3 and a thruster TH, a space probe R21 including tanks T4 and T5, and an artificial satellite ST5 positioned in an orbit of the moon.

The space probe 1b further includes a robot arm 15 in comparison to the space probe 1 according to the first embodiment, and includes a heater 16 and a tank 17, instead of the acquisition unit 14. The space probe 1b can dig up soil by using the robot arm 15.

Figure 9:
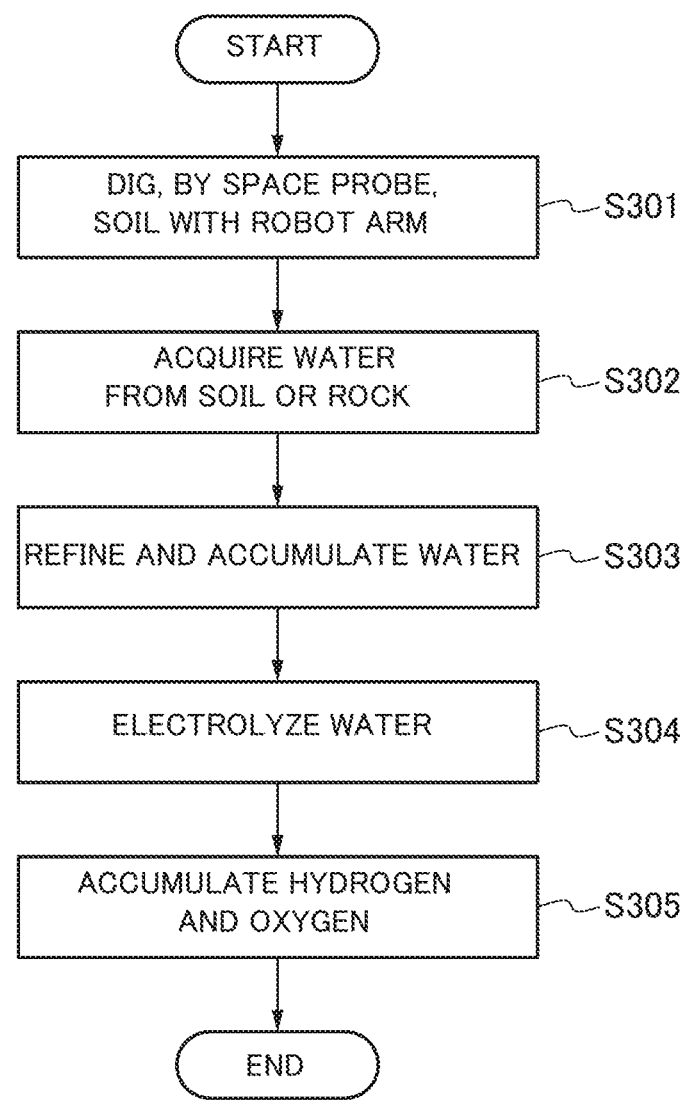
FIG. 9 is a flowchart showing an example of a flow of accumulation of hydrogen and oxygen.

Hereinafter, a flow of accumulation of hydrogen and oxygen will be described with reference to FIG. 9. FIG. 9 is a flowchart showing an example of a flow of accumulation of hydrogen and oxygen. In the following description, the space probe 1b is described as being positioned in a recess formed in the vicinity of the North Pole of the moon.

(Step S301) First, the space probe 1b digs soil with the robot arm 15.

(Step S302) Next, after digging the soil with the robot arm 15, the space probe 1b, for example, moves the dug soil, soil (for example, regolith) under the dug soil, a rock, or a block of ice into the tank 17 provided inside the space probe 1b by using the robot arm 15, and heats the soil, the rock, or the block of ice moved into the tank 17 by using the heater 16. With this arrangement, it is possible to acquire water by collecting or liquefying vapor obtained by evaporating ice in soil or a rock, or a block of ice. It should be noted that the method for acquiring water is not limited thereto and another method such as a method according to another embodiment can be used.

(Step S303) Next, the refinement unit 61 refines water supplied from the tank 17 through the pipe P1. Then, the refined water is supplied to the water tank 62 through the pipe P2, and is accumulated in the water tank 62.

(Step S304) Next, the electrolysis unit 63 electrolyzes water supplied from the water tank 62 through the pipe P3. Hydrogen and oxygen are generated after the electrolysis.

(Step S305) The hydrogen is supplied to the hydrogen tank 64 through the pipe P4, and is accumulated in the hydrogen tank 64. Meanwhile, the oxygen is supplied to the oxygen tank 65 through the pipe P5, and is accumulated in the oxygen tank 65.

Figure 10:
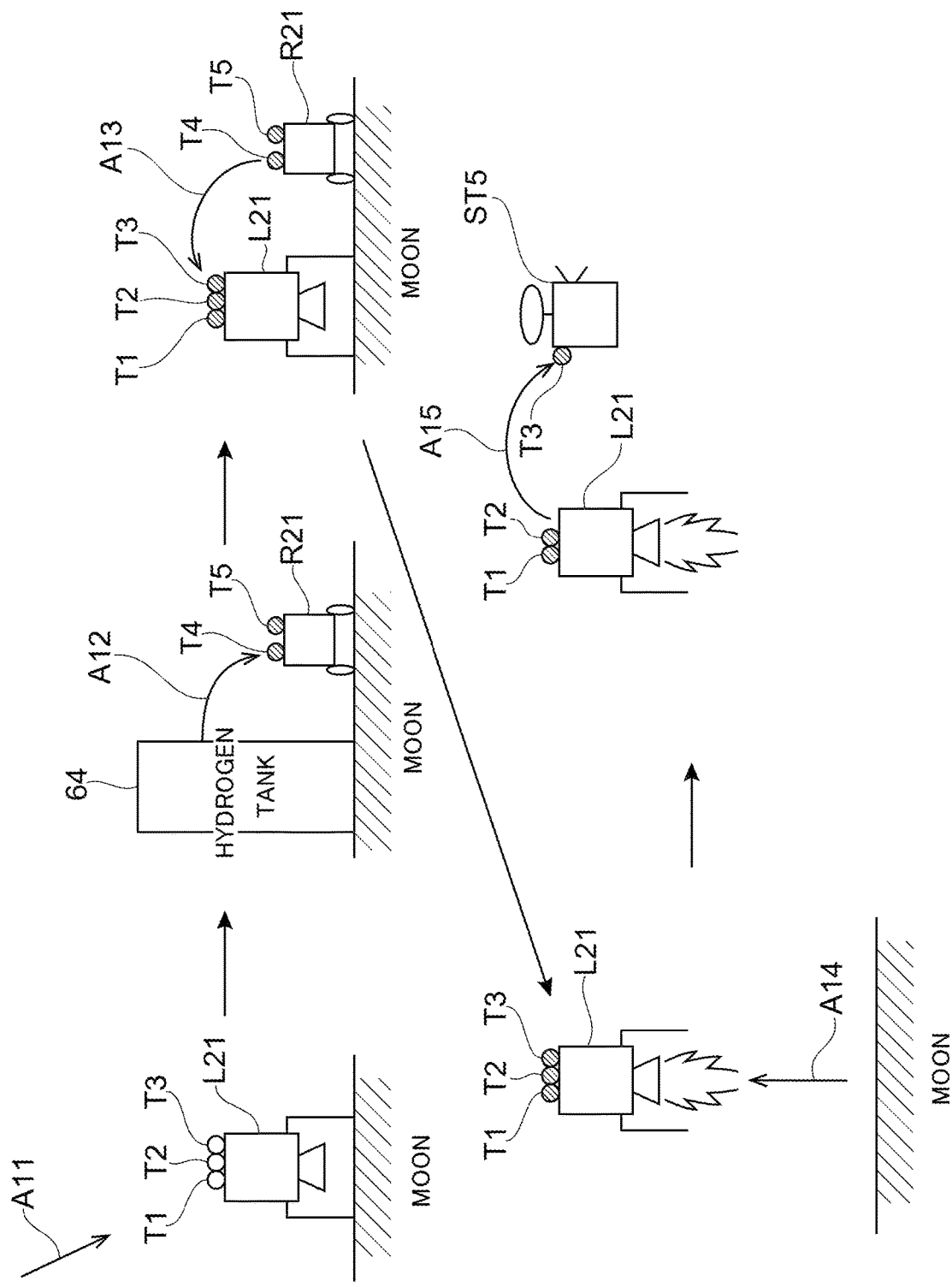
FIG. 10 is a schematic diagram showing a series of fixed examples in which a lander landing on a moon surface is refilled with hydrogen and is reused.

Next, a process of refilling a lander landing on the moon surface with hydrogen and reusing the lander will be described with reference to FIG. 10. FIG. 10 is a schematic diagram showing a series of fixed examples in which a lander landing on the moon surface is filled with hydrogen and is reused.

First, as indicated by an arrow. All, a lander L21 lands on the moon surface. Here, tanks T1 to T3 are empty.

Next, as indicated by an arrow A12, hydrogen is supplied from the hydrogen tank 64 to the tanks T4 and T5 of the space probe R21. Then, the space probe R21 moves close to the lander L21.

Next, as indicated by an arrow A13, hydrogen is supplied from the tanks T4 and T5 of the space probe R21 to the tanks T1 to T3 of the lander L21.

Next, as indicated by an arrow A14, the lander L21 takes off from the moon surface by burning hydrogen supplied to the tanks T1 to T3 as fuel.

Next, as indicated by an arrow A15, the lander L21 detaches an empty tank (not shown) from the artificial satellite ST5 in the orbit of the moon, and then connects the tank T3 filled with hydrogen to the artificial satellite ST5. With this arrangement, it is possible to supply hydrogen to the artificial satellite ST5.

As described above, a hydrogen supply method according to the sixth embodiment of the present disclosure includes collecting water on the moon, electrolyzing the collected water; filling the tanks T4 and T5 of the space probe R21 with hydrogen obtained by the electrolysis, and supplying the hydrogen from the tanks T4 and T5 of the space probe R21 to a target (here, for example, the tanks T1 to T3 of the lander L21) of a supply destination. According to the configuration, it is possible to supply hydrogen to a target of a supply destination. It should be noted that the target may also be another space probe, a hydrogen storage tank, or the like, other than the tanks T1 to T3 of the lander L21.

The hydrogen supply method according to the sixth embodiment further includes taking off the lander using the supplied hydrogen, and supplying hydrogen to a spacecraft (here, for example, an artificial satellite) as a hydrogen supply target in outer space or in an orbit of a satellite, a minor planet, or a planet (here, for example, the orbit of the moon). According to the configuration, it is possible to supply hydrogen to a spacecraft as a hydrogen supply target.

It should be noted that the spacecraft is not limited only to the artificial satellite, but may be a spaceship, a space station, an artificial planet, a space probe, or the like.

Seventh Embodiment

Next, a seventh embodiment will be described. An exploration system according to the seventh embodiment uses fuel remaining in a tank of a lander landing on the moon surface as fuel of a space probe.

Figure 11:
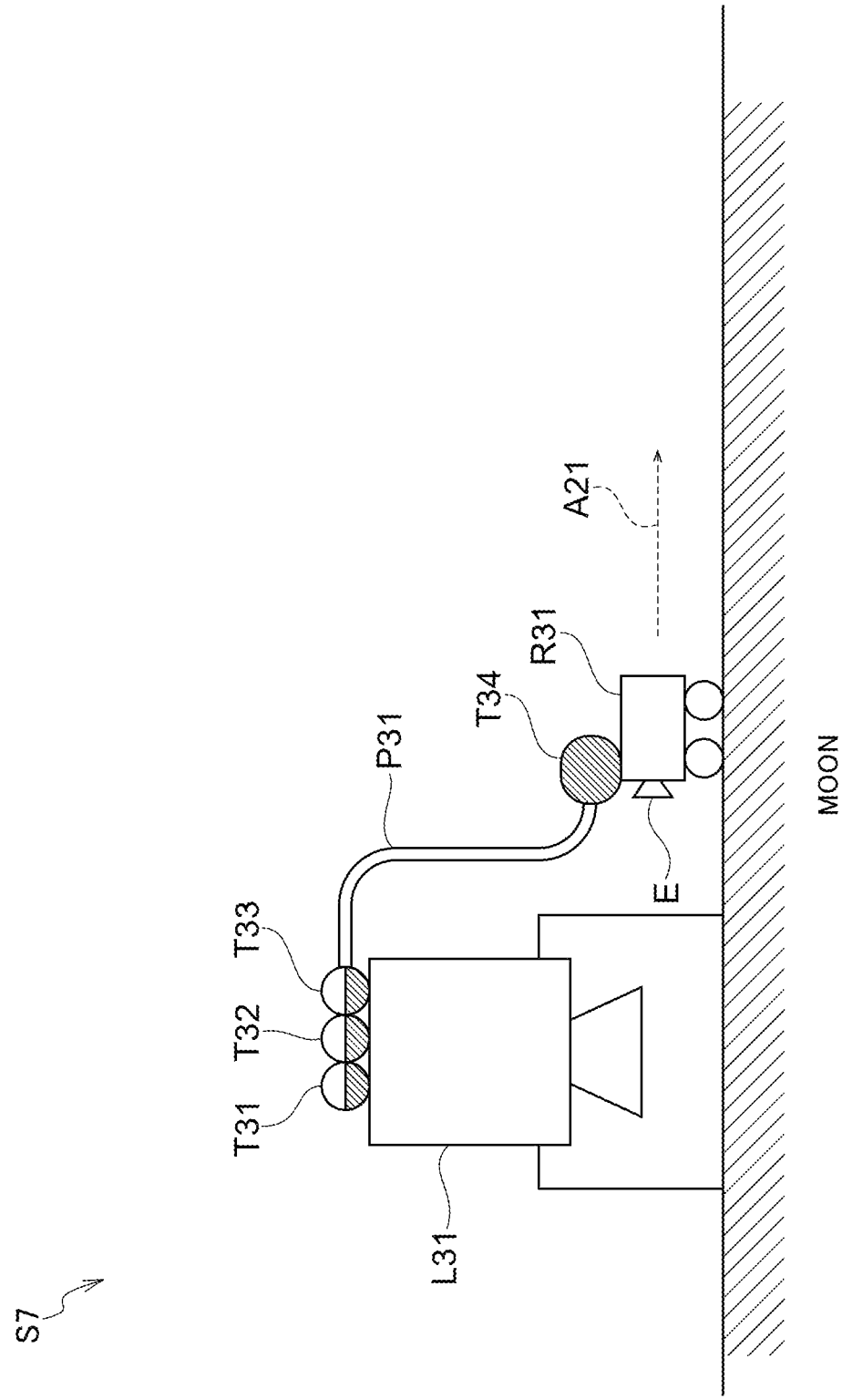
FIG. 11 is a diagram schematically showing a configuration of an exploration system according to a seventh embodiment.

FIG. 11 is a diagram schematically showing a configuration of the exploration system according to the seventh embodiment. As shown in FIG. 11, an exploration system S7 includes a lander L31 including tanks T31, T32, and T33, and a space probe R31 including a tank T4 and a power source E. Examples of the power source E include a small thruster. In the present embodiment, it is assumed that fuel remains in the tanks T31, T32, and T33 of the lander L31 landing on the moon surface. Under the assumption described above, the fuel is supplied from the tank T33 of the lander L31 to the tank T34 of the space probe R31 through a pipe P31.

Next, the space probe R31 drives the power source E by using the supplied fuel. With this arrangement, the space probe R31 can move on the moon surface as indicated by an arrow. A21.

As described above, an exploration method according to the seventh embodiment of the present disclosure includes supplying fuel from the lander L31 having a tank filled with the corresponding fuel to the tank of the space probe, and driving, by the space probe R31, the power source E by using the supplied fuel. With this arrangement, it is possible to utilize fuel remaining in the tanks T31 to T33 of the lander L31 as fuel of the space probe R31.

Eighth Embodiment

Next, an eighth embodiment will be described. In the eighth embodiment, a camera is ejected to a place where it is difficult for a space probe to enter (here, for example, a pit), the camera performs photographing at a spot where the camera lands after being ejected, and the camera transmits an image obtained by the photographing to the space probe.

Figure 12:
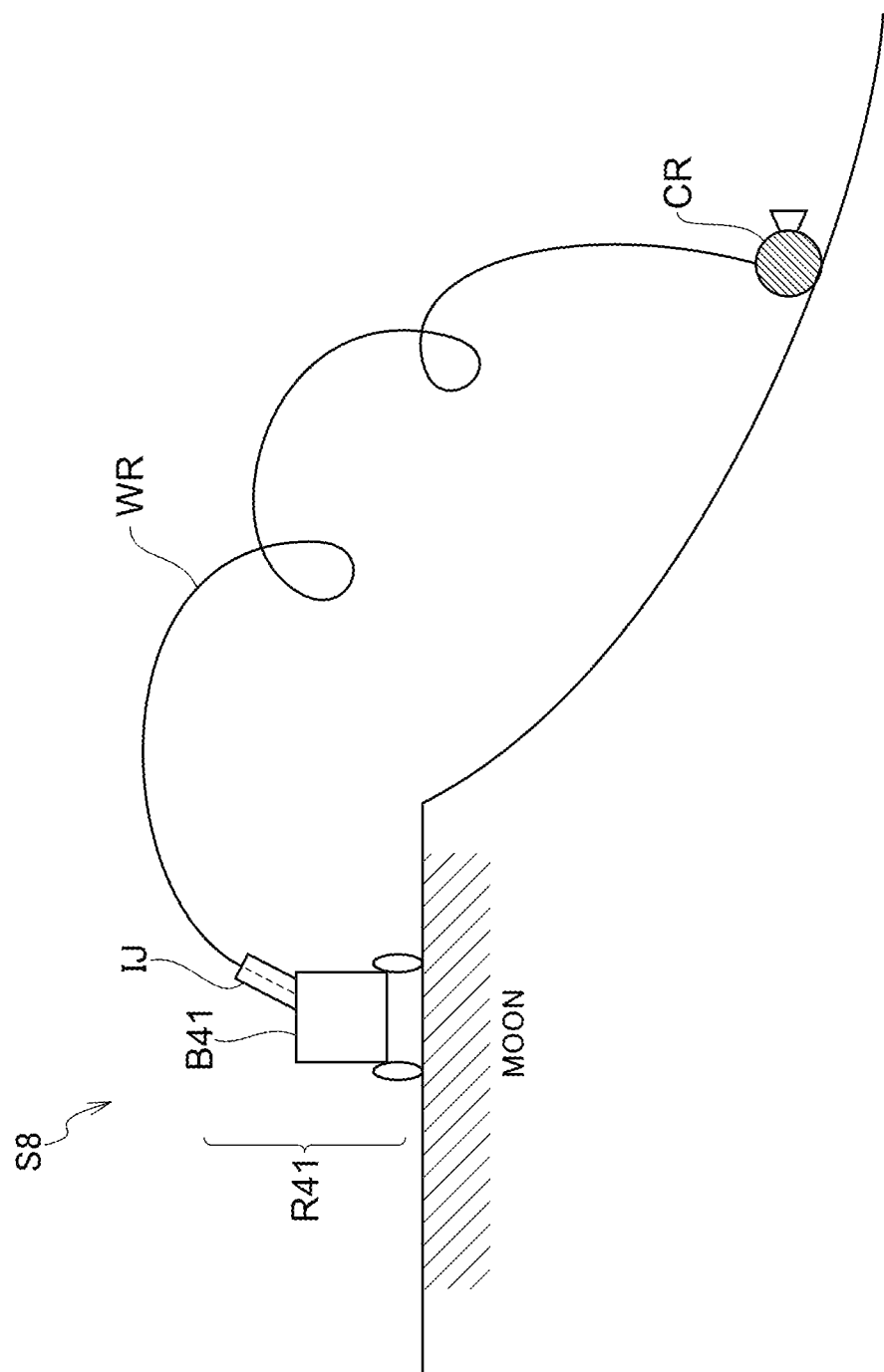
FIG. 12 is a diagram schematically showing a configuration of an exploration system according to an eighth embodiment.

FIG. 12 is a diagram schematically showing a configuration of the exploration system according to the eighth embodiment. As shown in FIG. 12, an exploration system S8 includes a space probe R41 disposed on the moon surface. The space probe R41 includes a space probe main body B41, a wiring WR, a camera CR connected to the space probe main body B41 through the wiring WR, and an ejection mechanism IJ ejecting the camera CR. FIG. 12 shows a state in which the camera CR is ejected by the ejection mechanism IJ and lands after being ejected. In this state, the camera CR performs photographing and transmits an image by the photographing to the space probe R41 through the wiring WR.

As described above, an exploration method according to the eighth embodiment of the present disclosure includes ejecting the camera CR from the space probe R41 including the ejection mechanism IJ, performing, by the camera CR, photographing at a spot where the camera CR lands after being ejected, and transmitting, by the camera CR, an image obtained by the photographing to the space probe R41 through the wiring WR. With this arrangement, even in a place where it is difficult for the space probe to enter, it is possible to obtain an image of an area in the vicinity of the corresponding place where it is difficult for the space probe to enter by flying the camera CR.

It should be noted that the space probe R41 may further include a winding mechanism for winding the wiring WR. The winding mechanism may wind the wiring WR to ejectably store the camera CR in the ejection mechanism IJ. With this arrangement, the camera can be repeatedly ejected and the photographing can be performed at different places.

In addition, the camera CR and the space probe main body B41 may have a wireless communication function, and in this case, an image may be wirelessly transmitted from the camera CR to the space probe main body B41.

Ninth Embodiment

Next, a ninth embodiment will be described. In an image conversion method according to the ninth embodiment of the present disclosure, a lander substitutes an image region of an obstacle included in an image photographed by a camera mounted in a space probe with an object constituted by polygons, or an object constituted by predetermined image units, and an image obtained after the substitution is transmitted from the lander to an earth station.

Figure 13:
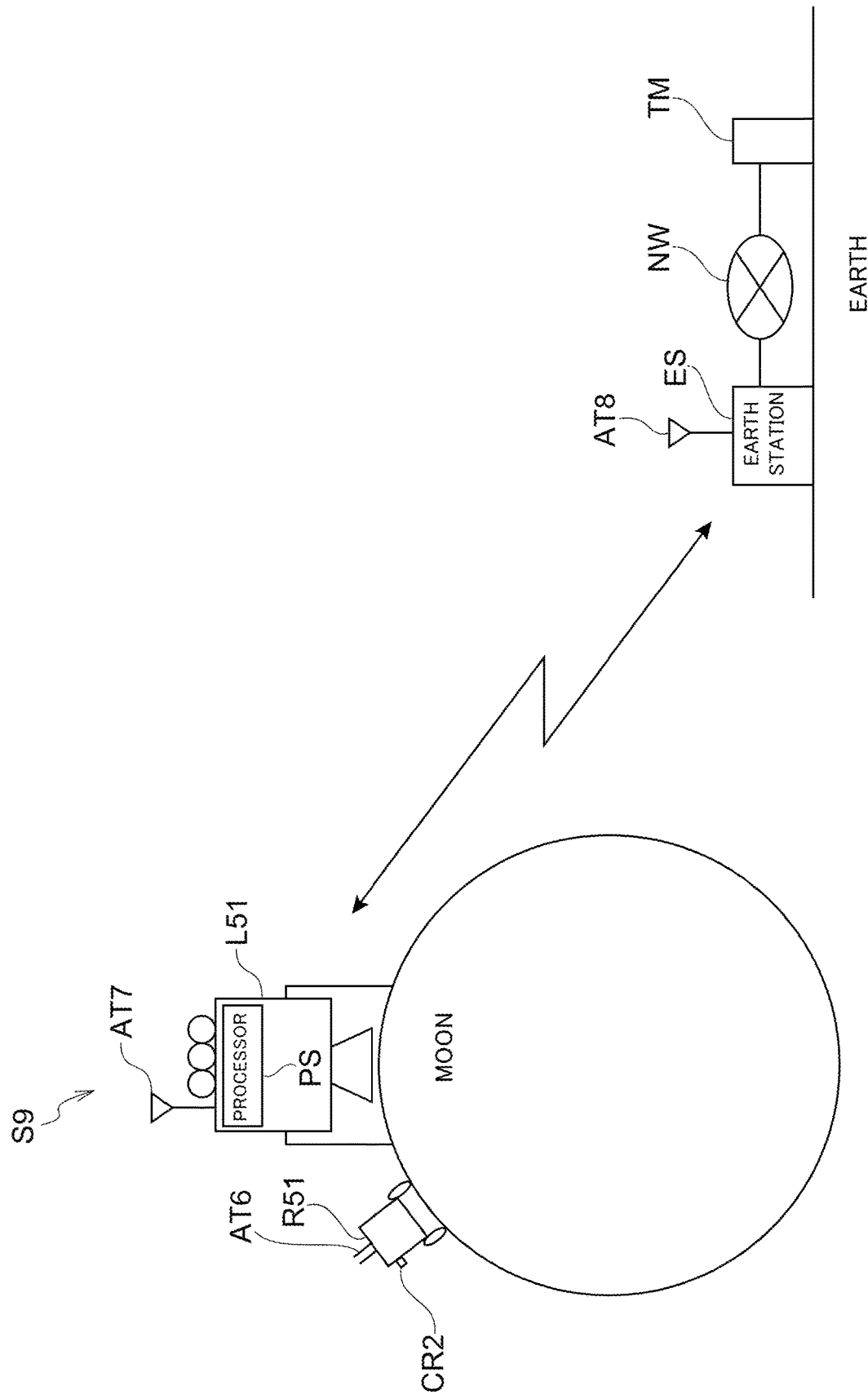
FIG. 13 is a diagram schematically showing a configuration of an exploration system according to a ninth embodiment.

FIG. 13 is a diagram schematically showing a configuration of the exploration system according to the ninth embodiment. As shown in FIG. 13, an exploration system S9 according to the ninth embodiment includes a space probe R51 including a camera CR2 and an antenna AT6 and disposed on the moon surface, and a lander L51 including a processor PS and an antenna AT7 and landing on the moon surface. The exploration system S9 further includes an earth station ES including an antenna AT8 and disposed on the earth, and a terminal device TM connected to the earth station through a communication network NW.

Next, an image processing according to the ninth embodiment will be described with reference to FIG. 14. FIG. 14 is a schematic diagram for describing the image processing according to the ninth embodiment. In FIG. 14, an image G1 is a schematic diagram of an image photographed by the camera CR2, in which image regions R91, R92, and R93 of obstacles are shown. An image G2 is a schematic diagram of an image in which the image regions R91, R92, and R93 of the obstacles included in the image G1 are substituted by objects OJ1, OJ2, and OJ3 constituted by polygons.

The processor PS of the lander L51 extracts the image regions R91, R92, and R93 of the obstacles, generates the objects OJ1, OJ2, and OJ3 having sizes corresponding to those of the image regions R91, R92, and R93, respectively, by using polygons, and substitutes the image regions R91, R92, and R93 of the obstacles with the generated objects OJ1, OJ2, and OJ3.

The objects OJ1, OJ2, and OJ3 are not limited to being constituted by polygons, and may also be constituted by predetermined image units. For example, the processor PS of the lander L51 may generate corresponding objects having sizes corresponding to those of the image regions of the obstacles by using corresponding image units.

Figure 15:
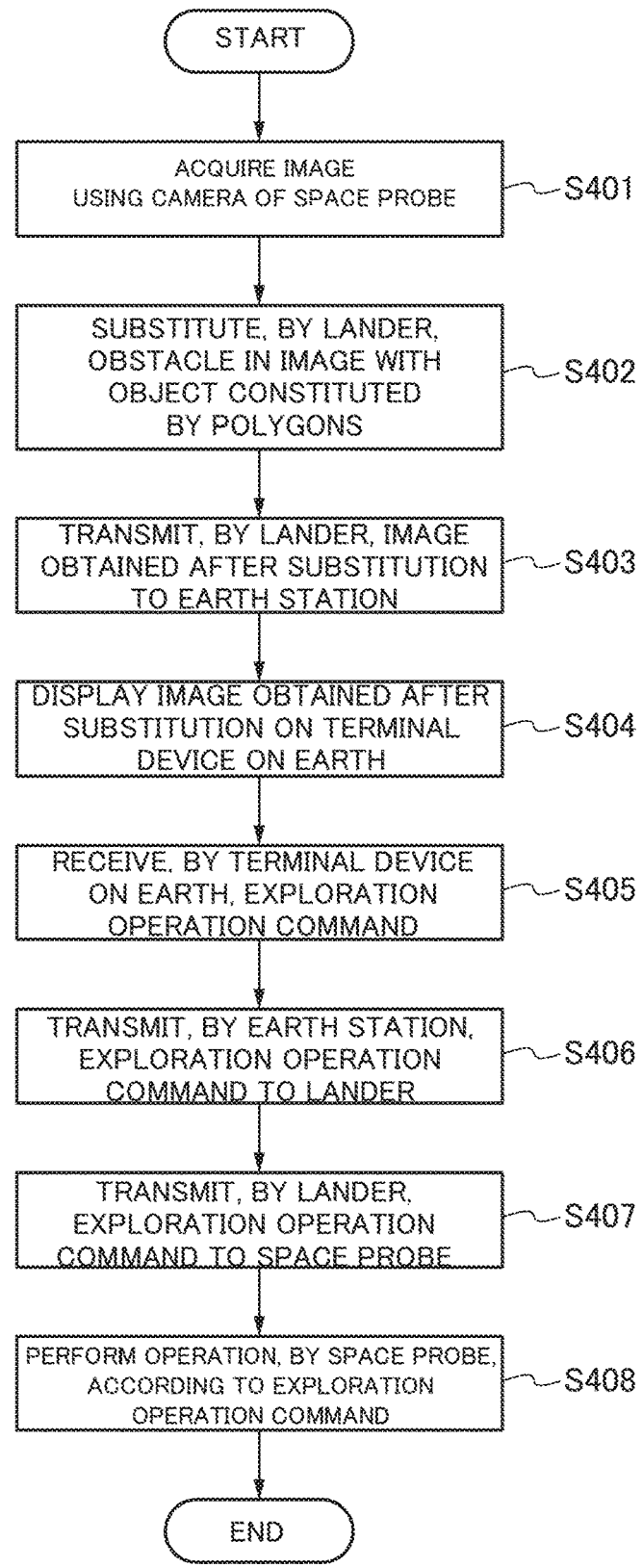
FIG. 15 is a flowchart showing an example of a flow of the processing according to the ninth embodiment.

Next, a flow of the processing according to the ninth embodiment will be described with reference to FIG. 15. FIG. 15 is a flowchart showing an example of the flow of the processing according to the ninth embodiment.

(Step S401) First, the space probe R51 uses the camera CR2 to perform photographing to acquire an image.

(Step S402) Next, the processor PS of the lander L51 substitutes an obstacle in the image acquired in step S401 with an object constituted by polygons.

(Step S403) Next, the lander L51 transmits an image obtained after the substitution to the earth station ES. With this arrangement, the earth station ES receives the image obtained after the substitution.

(Step S404) Next, the terminal device TM on the earth acquires and displays the image obtained after the substitution from the earth station ES through the communication network NW. With this arrangement, the image obtained after the substitution is displayed on the terminal device TM, and a user confirms the image to determine an exploration operation of a space probe.

(Step S405) Next, the terminal device TM on the earth receives an exploration operation command from the user and transmits the exploration operation command to the earth station ES. With this arrangement, the earth station ES receives the exploration operation command from the terminal device TM.

(Step S406) Next, the earth station ES transmits the exploration operation command to the lander L51.

(Step S407) Next, the lander L51 transmits the exploration operation command to the space probe R51. With this arrangement, the space probe R51 receives the exploration operation command.

(Step S408) Next, the space probe R51 performs an operation according to the exploration operation command.

As described above, the image processing method according to the ninth embodiment includes substituting, by the lander L51, an image region of an obstacle included in an image photographed by the camera CR2 mounted in the space probe R51 with an object generated so as to have a size corresponding to a size of the corresponding image region and constituted by polygons, or an object constituted by predetermined reference images, and transmitting an image obtained after the substitution from the lander L51 to the earth station ES. According to the configuration, it is possible to suppress an amount of traffic between the lander L51 and the earth station ES.

It should be noted that a processor of a space probe, instead of a processor PS of a lander, may perform the image processing described above.

As described above, the present disclosure is not limited to the above embodiments as they are, and in the implementation stage, the components can be modified and specified without departing from the gist of the present disclosure. In addition, various inventions can be made by appropriate combinations of a plurality of components disclosed in the above embodiments. For example, some components may be deleted from all the components shown in the embodiments. In addition, components in different embodiments may be combined as appropriate.

REFERENCE SIGNS LIST

1 Space probe
11, 12 Wheel
13 Detection unit
14 Acquisition unit
141 Heating unit
2, 21 Pipe
20 Rope
22 Wiring
3 Tank
4 Space probe
41, 42 Wheel
43, 51 Tank
44, 52 Solar cell
45, 53 Control unit
5 Lander
54 Communication unit
55 Antenna
61 Refinement unit
62 Water tank
63 Electrolysis unit
64 Hydrogen tank
65 Oxygen tank
S1 to S9 Exploration system
AT1 to AT8 Antenna
B41 Space probe main body
CC1 to CC5 Wireless communication circuit
CR, CR2 Camera
E Power source
ES Earth station
IJ Ejection mechanism
L1, L2, L11, L21, L23, L51 Lander
NC1 to NC4 Communication cable
P1 to P5 Pipe
PC1 to PC4 Power cable
R1, R2, R3, R11, R21, R31, R41, R51, R91 Space probe
RL1, RL2 Reflecting plate
ST1 to ST5 Artificial satellite
T1 to T3, T31 to T33, T34 Tank
TE1 to TE4 Rope
TH Thruster
TM Terminal device
WR Wiring

The invention claimed is:

1. An exploration method comprising:
   a step of digging a soil of a recess located in a permanent shadow which a satellite of a planet, a minor planet, or a planet has;
   a step of acquiring a water by collecting or liquefying vapor obtained by evaporating, through heating, ice included in soil or a rock, or a block of ice, or by liquefying the ice included in soil or a rock, or the block of ice, in the recess located in the permanent shadow;
   a step of storing the acquired water in a tank;
   a step of electrolyzing the stored water; and
   a step of supplying hydrogen obtained by electrolyzing the stored water, to a supply target; and
   a step of generating, by a solar cell disposed on a moon surface other than the permanent shadow, power,
   wherein in the acquiring step, the water is acquired by collecting vapor obtained by evaporating ice through heating of soil or a rock or a block of ice using the generated power.

2. The exploration method according to claim 1, wherein in the storing step, the acquired water is delivered to a tank through a pipe to be stored in the corresponding tank.

3. The exploration method according to claim 1 comprising:
   a step of ejecting a camera from a space probe including an ejection mechanism;
   a step of performing, by the camera, photographing at a spot where the camera lands after being ejected; and
   a step of transmitting, by the camera, an image obtained by the photographing to the space probe.

4. The exploration method according to claim 1 comprising:
   a step of substituting, by a lander or a space probe, an image region of an obstacle included in an image photographed by a camera mounted in the space probe with an object generated so as to have a size corresponding to a size of the corresponding image region and constituted by polygons, or an object constituted by predetermined reference images; and
   a step of transmitting an image obtained after the substitution from the lander to an earth station.

* * * * *